United States Patent
Choi

(10) Patent No.: US 12,256,377 B2
(45) Date of Patent: Mar. 18, 2025

(54) SIDELINK DATA TRANSMISSION METHOD FOR ULTRA-LOW LATENCY AND HIGH RELIABILITY COMMUNICATION IN WIRELESS COMMUNICATION SYSTEM AND APPARATUS THEREFOR

(71) Applicant: UUCOM CO., LTD, Gwacheon (KR)

(72) Inventor: Su Han Choi, Gwacheon-Si (KR)

(73) Assignee: UUCOM CO., LTD, Gwacheon (KR)

( * ) Notice: Subject to any disclaimer, the term of this patent is extended or adjusted under 35 U.S.C. 154(b) by 349 days.

(21) Appl. No.: 17/771,008

(22) PCT Filed: Oct. 28, 2020

(86) PCT No.: PCT/KR2020/014770
§ 371 (c)(1),
(2) Date: Apr. 22, 2022

(87) PCT Pub. No.: WO2021/096108
PCT Pub. Date: May 20, 2021

(65) Prior Publication Data
US 2022/0377764 A1 Nov. 24, 2022

(30) Foreign Application Priority Data

Nov. 13, 2019 (KR) .................. 10-2019-0145302
Jun. 30, 2020 (KR) .................. 10-2020-0079903

(51) Int. Cl.
*H04W 92/18* (2009.01)
*H04L 1/1812* (2023.01)
(Continued)

(52) U.S. Cl.
CPC ....... *H04W 72/1263* (2013.01); *H04L 1/1816* (2013.01); *H04W 72/23* (2023.01)

(58) Field of Classification Search
CPC ... H04W 72/1263; H04W 72/23; H04W 4/40; H04W 92/18; H04L 1/1816
See application file for complete search history.

(56) References Cited

U.S. PATENT DOCUMENTS

2018/0070264 A1* 3/2018 Saiwai .................. H04W 72/04
2018/0368090 A1 12/2018 Kadambar et al.
(Continued)

FOREIGN PATENT DOCUMENTS

| KR | 10-2019-0008387 A | 1/2019 | |
| KR | 10-2019-0104415 A | 9/2019 | |
| WO | WO-2020033089 A1 * | 2/2020 | ........... H04L 1/1819 |

OTHER PUBLICATIONS

3GPP TSG RAN WG1 Meeting #86, R1-167751, Title: Details on PSCCH/PSSCH transmisison timing in UE autonomous resource selection mode (Year: 2016).*

(Continued)

*Primary Examiner* — Christopher M Crutchfield
*Assistant Examiner* — Abusayeed M Haque
(74) *Attorney, Agent, or Firm* — Insight Law Group, PLLC; Seung Lee

(57) ABSTRACT

A sidelink data transmission method for ultra-low latency and high reliability communication in a wireless communication system and an apparatus therefor are provided. A method for transmitting sidelink configuration information by a base station according to an embodiment of the present disclosure includes transmitting first sidelink configuration information to a transmitting UE and a receiving UE, transmitting second sidelink configuration information to the transmitting UE and the receiving UE, receiving a result of repeated transmission of sidelink data from the transmitting UE or the receiving UE, determining at least one of whether the sidelink data is retransmitted or the number of repeated transmissions for next sidelink data to be transmitted, and transmitting downlink control information to the transmitting UE and the receiving UE.

16 Claims, 15 Drawing Sheets

(51) Int. Cl.
*H04W 4/40* (2018.01)
*H04W 72/1263* (2023.01)
*H04W 72/23* (2023.01)
*H04W 72/25* (2023.01)

(56) References Cited

U.S. PATENT DOCUMENTS

| | | | |
|---|---|---|---|
| 2019/0254091 A1 | 8/2019 | Kim et al. | |
| 2019/0342790 A1 | 11/2019 | Saiwai et al. | |
| 2020/0052843 A1* | 2/2020 | Cheng | H04W 76/14 |
| 2020/0106566 A1* | 4/2020 | Yeo | H04L 1/1854 |
| 2020/0146044 A1* | 5/2020 | Maaref | H04W 72/02 |
| 2020/0267729 A1* | 8/2020 | Kim | H04W 72/20 |
| 2020/0366427 A1* | 11/2020 | Wang | H04L 1/1816 |
| 2021/0266110 A1* | 8/2021 | Wang | H04W 72/0446 |
| 2021/0306824 A1* | 9/2021 | Li | H04W 4/40 |

OTHER PUBLICATIONS

3GPP TSG-RAN WG2 Meeting #91, R2-153983, Title:LS on gap handling for sidelink discovery (Year: 2015).*
R1-1911419_Vivo.
R1-1910843_Panasonic.
R1-1906596_Huawei.
Samsung, "Time-frequency hopping design for Mode 1 resource allocation", 3GPP RSG RAN WG1 Meeting #78, Dresden, Germany, Aug. 18-22, 2014, R1-143089.
ZTE et al., "Mode 1 resource allocation schemes on sidelink", 3GPP TSG RAN WG1 #96bis, Xi'an, China, Apr. 8-12, 2019, R1-1905341.
Vivo, "Discussion on mode 1 resource allocation mechanism", 3GPP TSG RAN WG1 Meeting #98bis, Chongping, China, Oct. 14-20, 2019, R1-1911419.
Vivo, "Discussion on mode 1 resource allocation mechanism", 3GPP TSG RAN WG1 Meeting #99, Reno, USA, Nov. 18-22, 2019, R1-1912021.
LG Electronics, "Discussion on NR sidelink resource allocation for Mode 1", 3GPP TSG RAN WG1 #99 Meeting, Reno, U.S., Nov. 18-22, 2019, R1-1912587.
Notice of Allowance mailed on Dec. 5, 2023 from the Korean Patent Office for Korean Application No. 10-2022-0104615.
Panasonic. "Discussion on physical layer procedure for sidelink in NR V2X". R1-1910843, 3GPP TSG RAN WGI #98bis. Chongqing, China. Oct. 7, 2019.
Huawei et al. "Design and contents of PSCCH and PSFCH". R1-1906596, 3GPP TSG RAN WGI Meeting #97. Reno, USA. May 3, 2019.
Huawei et al., "Sidelink resource allocation mode 1", R1-1911883, 3GPP TSG RAN WGI Meeting #99, Reno USA, Nov. 18-22, 2019.
Ericsson, "Uu-based sidelink resource allocation", R1-1912598, 3GPP TSG-RAN WG1 Meeting #99, Reno, NV, US 18-22 2019.
Notice of Allowance mailed on May 23, 2022 from the Korean Patent Office for Korean Application No. 10-2020-0079903.
Non-final Office Action mailed on Nov. 12, 2021 from the Korean Patent Office for Korean Application No. 10-2020-0079903.
International Search Report mailed on Feb. 9, 2021 for International Application No. PCT/KR2020/014770 and its English translation.
Written Opinion mailed on Feb. 9, 2021 for International Application No. PCT/KR2020/014770 and its English translation.
3GPP R1-1911883.
3GPP R1-1912598.
3GPP R1-1906596.

* cited by examiner

SIDELINK DATA TRANSMISSION METHOD FOR ULTRA-LOW LATENCY AND HIGH RELIABILITY COMMUNICATION IN WIRELESS COMMUNICATION SYSTEM AND APPARATUS THEREFOR

CROSS-REFERENCE TO RELATED APPLICATIONS

This application is a national stage of International Application No. PCT/KR2020/014770, filed on Oct. 28, 2020, which claims the benefit of priority to Korean Application No. 10-2019-0145302, filed on Nov. 13, 2019, and Korean Application No. 10-2020-0079903, filed on Jun. 30, 2020 in the Korean Intellectual Property Office, the disclosures of which are incorporated herein by reference.

BACKGROUND OF THE DISCLOSURE

Field of the Disclosure

The present disclosure relates to a wireless communication system, and more particularly, to a method and apparatus for performing ultra-low latency and high reliability communication in sidelink.

Related Art

For communication in various application fields corresponding to 5G URLLC (Ultra-Reliable and Low Latency Communication) scenarios, it is necessary to transmit data rapidly and stably. However, when a UE moves in a direction in which a channel deteriorates in an environment in which the UE moves rapidly, an error may occur in data, and thus a situation in which the corresponding data needs to be retransmitted may occur.

In the case of normal data transmission, there is no problem even if data is retransmitted. However, in the case of transmitting URLLC data, a problem of increased latency may occur if retransmission is performed.

In particular, URLLC transmission is very important in V2X, and sidelink (SL) is often applied to V2X, and thus it is important to apply URLLC to SL.

SUMMARY

It is an object of the present disclosure to provide a sidelink data transmission method and apparatus for ultra-low latency and high reliability communication in a wireless communication system.

Another object of the present disclosure is to provide a sidelink data transmission method and apparatus having low probability of occurrence of error and latency even in an environment in which a UE moves rapidly.

According to an aspect of the present disclosure, it is possible to provide a sidelink data transmission method and apparatus for ultra-low latency and high reliability communication in a wireless communication system.

Advantageous Effects

According to the present disclosure, a sidelink data transmission method and apparatus for ultra-low latency and high reliability communication in a wireless communication system are provided.

In addition, a sidelink data transmission method and apparatus having low probability of occurrence of error and latency even in an environment in which a UE moves rapidly are provided.

DESCRIPTION OF EXEMPLARY EMBODIMENTS

Figure 1:
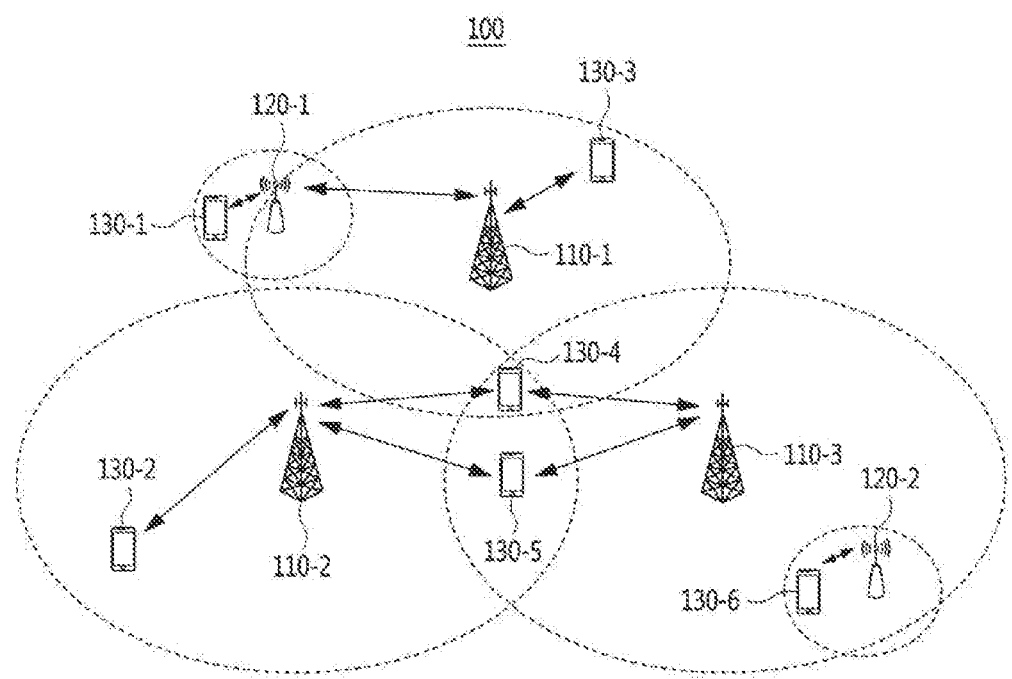
FIG. 1 is a conceptual diagram illustrating a wireless communication system according to an embodiment of the present disclosure.

The present disclosure can be modified in various manners and can have various embodiments, and thus specific embodiments will be illustrated in the drawings and described in detail. However, this is not intended to limit the present disclosure to specific embodiments and should be understood to include all modifications, equivalents and substitutes included in the spirit and scope of the present invention. In the drawings, like reference numerals are used for like elements.

It will be understood that, although the terms "first", "second", "A", "B", etc. may be used herein to describe various elements, these terms are only used to distinguish one element from another element and corresponding elements are not limited by these terms. For example, a first element may be referred to as a second element, and similarly, the second element may be referred to as the first element without departing from the scope of the present invention. The term "and/or" includes a combination of a plurality of related listed items or any of a plurality of related listed items.

It will be understood that when one element is referred to as being "connected to" or "coupled to" another element, another element may be interposed between the two elements although one element may be directly connected to or directly coupled to another element. On the other hand, when one element is referred to as being "directly connected to" or "directly coupled to" another element, it will be understood that another element is not present therebetween.

The terms used in the present specification are merely used in order to describe particular embodiments and are not intended to limit the scope of the present invention. For example, an element described in the singular form is intended to include a plurality of elements unless the context clearly indicates otherwise. In addition, in the present specification, it will be further understood that the term "comprise" or "include" specifies the presence of stated features, integers, steps, operations, elements, components, and/or combinations thereof, but do not preclude the presence or addition of one or more other features, integers, steps, operations, elements, components, and/or combinations.

Unless otherwise defined, all terms including technical and scientific terms used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Hereinafter, preferred embodiments according to the present disclosure will be described in detail with reference to the accompanying drawings.

FIG. 1 is a conceptual diagram illustrating a wireless communication system according to an embodiment of the present disclosure.

Referring to FIG. 1, a wireless communication system 100 may include a plurality of communication nodes 110-1, 110-2, 110-3, 120-1, 120-2, 130-1, 130-2, 130-3, 130-4, 130-5 and 130-6.

Each of the plurality of communication nodes may support at least one communication protocol. For example, each of the plurality of communication nodes may support a CDMA (Code Division Multiple Access) based communication protocol, a WCDMA (Wideband CDMA) based communication protocol, a TDMA (Time Division Multiple Access) based communication protocol, an FDMA (Frequency Division Multiple) Access) based communication protocol, an OFDM (Orthogonal Frequency Division Multiplexing) based communication protocol, an OFDMA (Orthogonal Frequency Division Multiple Access) based communication protocol, an SC (Single Carrier)-FDMA based communication protocol, a NOMA (Non-Orthogonal Multiplexing Access) based communication protocol, an SDMA (Space Division Multiple Access) based communication protocol, etc.

The wireless communication system 100 may include a plurality of base stations 110-1, 110-2, 110-3, 120-1 and 120-2 and a plurality of UEs 130-1, 130-2, 130-3, 130-4, 130-5 and 130-6.

Each of the first base station 110-1, the second base station 110-2, and the third base station 110-3 may form a macro cell. Each of the fourth base station 120-1 and the fifth base station 120-2 may form a small cell. The fourth base station 120-1, the third UE 130-3, and the fourth UE 130-4 may belong to the coverage of the first base station 110-1. The second UE 130-2, the fourth UE 130-4, and the fifth UE 130-5 may belong to the coverage of the second base station 110-2. The fifth base station 120-2, the fourth UE 130-4, the fifth UE 130-5, and the sixth UE 130-6 may belong to the coverage of the third base station 110-3. The first UE 130-1 may belong to the coverage of the fourth base station 120-1. The sixth UE 130-6 may belong to the coverage of the fifth base station 120-2.

Here, each of the plurality of base stations 110-1, 110-2, 110-3, 120-1 and 120-2 may be referred to as a NodeB, an evolved NodeB, a next-generation NodeB (gNB), a base transceiver station (BTS), a radio base station, a radio transceiver, an access point, an access node, a roadside unit (RSU), a digital unit (DU), a cloud digital unit (CDU), a radio remote head (RRH), a radio unit (RU), a transmission point (TP), a transmission and reception point (TRP), a relay node, or the like. Each of the plurality of UEs 130-1, 130-2, 130-3, 130-4, 130-5 and 130-6 may be referred to as a UE, an access UE, a mobile UE, a station, a subscriber station, a mobile station, a portable subscriber station, a node, a device, or the like.

The plurality of communication nodes 110-1, 110-2, 110-3, 120-1, 120-2, 130-1, 130-2, 130-3, 130-4, 130-5 and 130-6 may support LTE (Long Term Evolution), LTE-A (advanced), NR (New Radio), etc. defined in cellular communication (e.g., 3rd generation partnership project (3GPP)) standards. The plurality of base stations 110-1, 110-2, 110-3, 120-1 and 120-2 may operate in different frequency bands or may operate in the same frequency band. The plurality of base stations 110-1, 110-2, 110-3, 120-1 and 120-2 may be connected to each other through an ideal backhaul or a non-ideal backhaul and exchange information with each other through the ideal backhaul or the non-ideal backhaul. The plurality of base stations 110-1, 110-2, 110-3, 120-1 and 120-2 may be connected to a core network (not shown) through the ideal backhaul or the non-ideal backhaul. Each of the plurality of base stations 110-1, 110-2, 110-3, 120-1 and 120-2 may transmit a signal received from the core network to the corresponding UEs 130-1, 130-2, 130-3, 130-4, 130-5 and 130-6) and transmit signals received from the corresponding UEs 130-1, 130-2, 130-3, 130-4, 130-5 and 130-6 to the core network.

Each of the plurality of base stations 110-1, 110-2, 110-3, 120-1 and 120-2 may support OFDMA based downlink transmission and support OFDMA or SC-FDMA based uplink transmission. In addition, each of the plurality of base stations 110-1, 110-2, 110-3, 120-1 and 120-2 may support multiple input multiple output (MIMO) (e.g., single user (SU)-MIMO, multi-user (MU)-MIMO, massive MIMO, etc.) transmission, Coordinated Multipoint (CoMP) transmission, carrier aggregation transmission, transmission in an unlicensed band, device-to-device (D2D) communication (or proximity services (ProSe)), etc. Here, the plurality of UEs 130-1, 130-2, 130-3, 130-4, 130-5 and 130-6 may perform operations corresponding to the base stations 110-1, 110-2, 110-3, 120-1 and 120-2 and/or operations supported by the base stations 110-1, 110-2, 110-3, 120-1 and 120-2.

For example, the second base station 110-2 may transmit a signal to the fourth UE 130-4 based on SU-MIMO, and the fourth UE 130-4 may receive the signal from the second base station 110-2 through SU-MIMO. Further, the second base station 110-2 may transmit a signal to the fourth UE 130-4 and the fifth UE 130-5 based on the MU-MIMO, and the fourth UE 130-4 and the fifth UE 130-5 may receive the signal from the second base station 110-2 through MU-MIMO. The first base station 110-1, the second base station 110-2, and the third base station 110-3 may transmit signals to the fourth UE 130-4 based on CoMP, and the fourth UE 130-4 may receive the signals from the first base station 110-1, the second base station 110-2, and the third base station 110-3 through CoMP. The plurality of base stations 110-1, 110-2, 110-3, 120-1 and 120-2 may transmit/receive signals to/from UEs 130-1, 130-2, 130-3, 130-4, 130-5 and 130-6 belonging to their coverages based on the CA method.

The first base station 110-1, the second base station 110-2, and the third base station 110-3 may coordinate D2D communication between the fourth UE 130-4 and the fifth UE 130-5, and the fourth UE 130-4 and the fifth UE 130-5 may perform D2D communication according to coordination of the second base station 110-2 and the third base station 110-3.

Hereinafter, even when a method (e.g., transmission or reception of a signal) performed in a first communication node among communication nodes is described, a second communication node corresponding thereto may perform a method (e.g., reception of transmission of a signal) corresponding to the method performed in the first communication node. That is, when an operation of a UE is described, a base station corresponding thereto may perform an operation corresponding to the operation of the UE. On the other hand, when an operation of a base station is described, a UE corresponding thereto may perform an operation corresponding to the operation of the base station.

Hereinafter, downlink (DL) means communication from a base station to a UE, and uplink (UL) means communication from a UE to a base station. On downlink, a transmitter may be a part of a base station and a receiver may be a part of a UE. On uplink, a transmitter may be a part of a UE and a receiver may be a part of a base station.

Recently, the amount of information exchanged through communication networks has increased with the rapid spread of smartphones and Internet of Things (IoT) UEs. Accordingly, in next-generation wireless access technology, it is necessary to consider an environment (e.g., enhanced mobile broadband communication) that provides faster services to more users than a conventional communication system (or conventional radio access technology). To this end, design of a communication system considering MTC (Machine Type Communication) providing services by connecting a plurality of devices and objects is under discussion. In addition, design of a communication system (e.g., URLLC (Ultra-Reliable and Low Latency Communication)) considering a service and/or UE sensitive to communication reliability and/or latency is also under discussion.

In the present specification, the next-generation radio access technology is referred to as New Radio Access Technology (RAT) and a wireless communication system to which New RAT is applied is referred to as a New Radio (NR) system for convenience of description.

Figure 2:
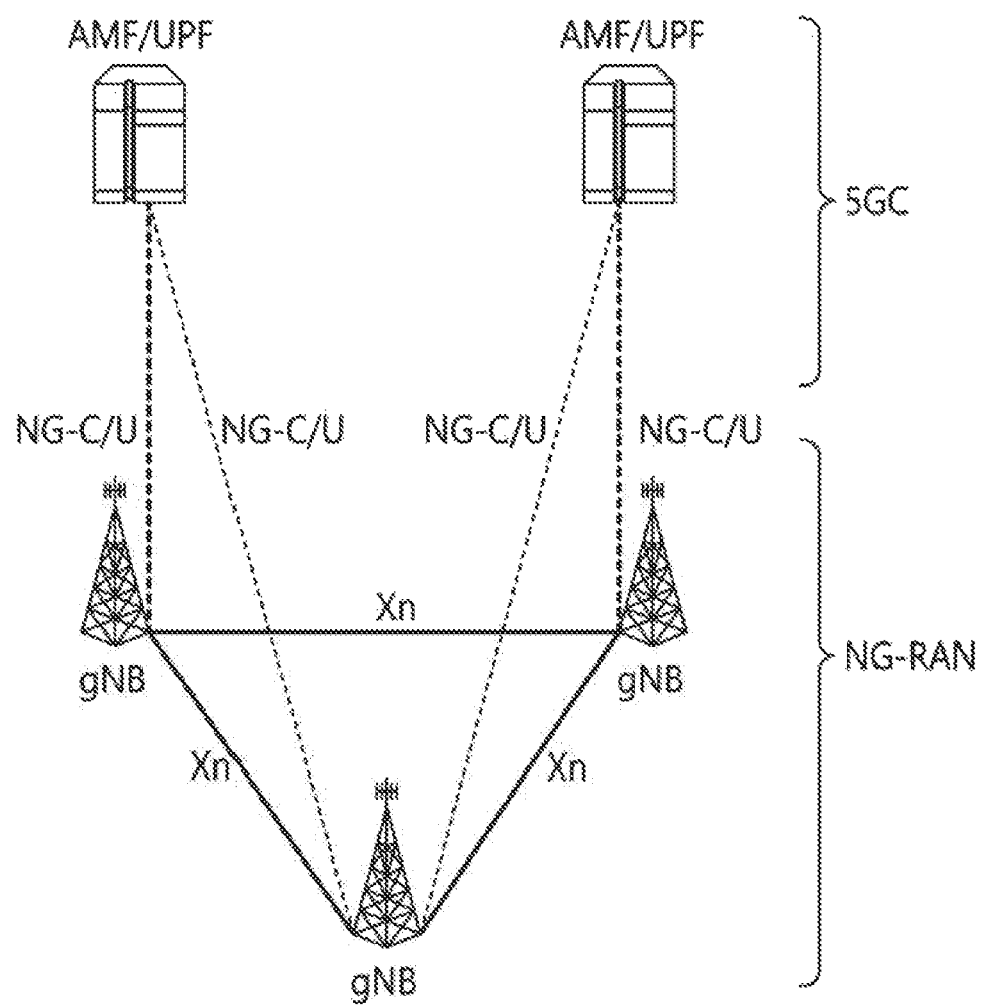
FIG. 2 is an exemplary diagram illustrating an NR system to which a data transmission method according to an embodiment of the present disclosure is applicable.

FIG. 2 is an exemplary diagram illustrating an NR system to which a data transmission method according to an embodiment of the present disclosure is applicable.

Referring to FIG. 2, NG-RAN (Next Generation-Radio Access Network) is composed of gNBs providing NG-RA user plane (SDAP/PDCP/RLC/MAC/PHY) and control plane (RRC) protocol termination for UE. (NG-RAN may also include a base station, which is an existing LTE base station.) Here, NG-C represents a control plane interface used for an NG2 reference point between NG-RAN and 5GC (5 Generation Core). NG-U represents a user plane interface used for an NG3 reference point between NG-RAN and 5GC.

The gNBs are interconnected through an Xn interface and connected to 5GC through an NG interface. More specifically, the gNBs are connected to an Access and Mobility Management Function (AMF) through an NG-C interface and connected to a User Plane Function (UPF) through an NG-U interface.

In the NR system of FIG. 2, multiple numerologies may be supported. Here, numerology may be defined by a subcarrier spacing (SCS) and a cyclic prefix (CP) overhead. In this case, a plurality of subcarrier spacings may be derived by scaling a basic subcarrier spacing by an integer. Further, even if it is assumed that a very low subcarrier spacing is not used at very high carrier frequencies, a numerology to be used can be selected independently of the frequency band.

In addition, in the NR system, various frame structures according to a number of numerologies may be supported. Hereinafter, an OFDM numerology and a frame structure used in a data transmission method according to an embodiment of the present disclosure will be described with reference to FIG. 3.

Figure 3:
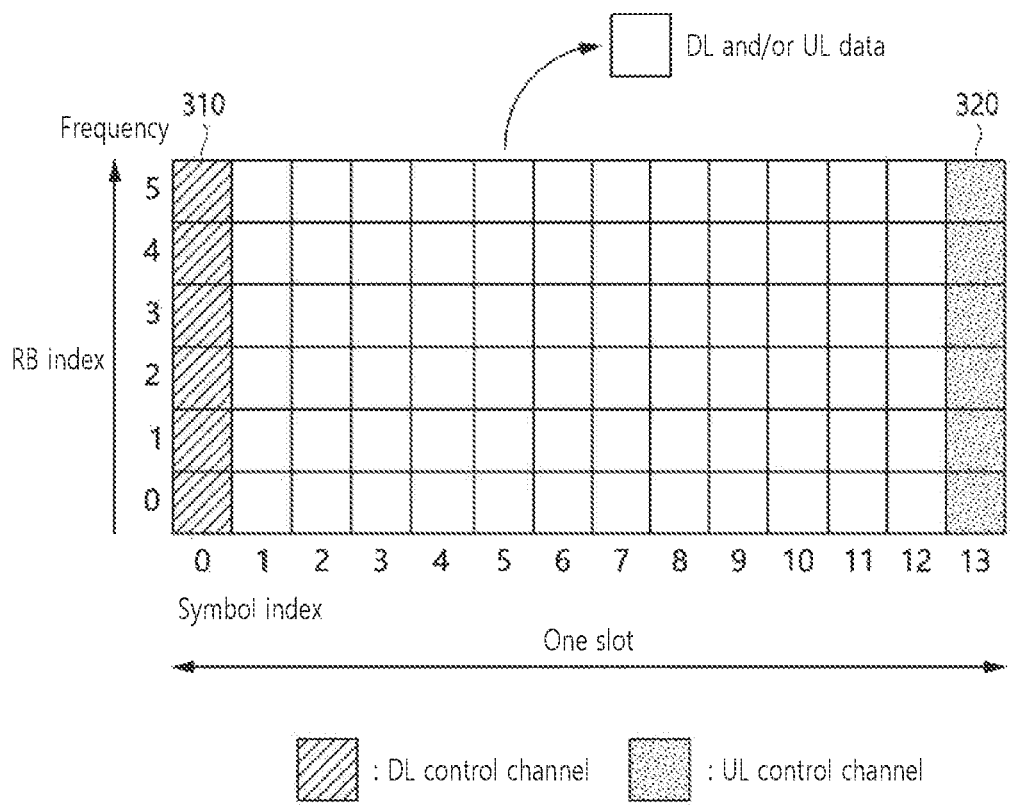
FIG. 3 is a diagram illustrating a slot structure used in the data transmission method according to an embodiment of the present disclosure.

FIG. 3 is a diagram illustrating a slot structure used in a data transmission method according to an embodiment of the present disclosure.

A Time Division Duplexing (TDD) structure considered in the NR system is a structure in which both uplink (UL) and downlink (DL) are processed in one slot (or subframe). This is for the purpose of minimizing latency of data transmission in a TDD system and may be referred to as a self-contained structure or a self-contained slot.

Referring to FIG. 3, one slot may include 14 OFDM symbols (in case of using an extended CP, it includes 12 OFDM symbols). In FIG. 3, region 310 indicates a downlink control region, and a region 320 indicates an uplink control region. Here, unlike shown in FIG. 3, the numbers of symbols used for the downlink and uplink control regions in one slot may be greater than one. Regions other than the regions 310 and 320 (that is, regions without a separate indication) may be used for transmission of downlink data or uplink data. That is, uplink control information and downlink control information may be transmitted in one slot. Further, in the case of data, uplink data and downlink data may be transmitted in one slot.

When the structure shown in FIG. 3 is used, downlink transmission and uplink transmission are sequentially performed within one slot, and transmission of downlink data and reception of uplink ACK/NACK may be performed. Accordingly, when an error in data transmission occurs, a time required for data retransmission can be reduced. Accordingly, latency associated with data transmission can be minimized.

In the slot structure as shown in FIG. 3, a time gap is required for a process in which a base station and/or a UE switch from a transmission mode to a reception mode or a process in which the base station and/or the UE switch from the reception mode to the transmission mode. With respect to the time gap, when uplink transmission is performed after downlink transmission in the slot, some OFDM symbol(s) may be configured as a guard period (GP).

Figure 4:
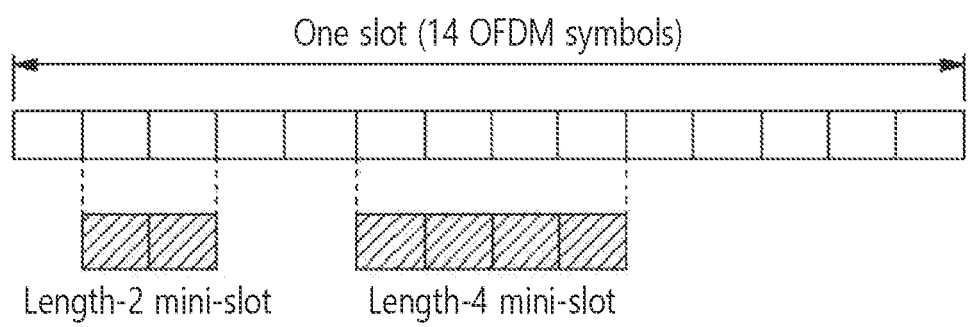
FIG. 4 is a diagram for describing a mini-slot used in the data transmission method according to an embodiment of the present disclosure.

FIG. 4 is a diagram for describing a mini-slot used in a data transmission method according to an embodiment of the present disclosure.

According to an embodiment of the present disclosure, mini-slot based scheduling may be supported in addition to slot based scheduling for efficient support of URLLC. (A mini-slot based transmission method is also called a non-slot transmission method.) A mini-slot is a minimum scheduling unit handled by a base station and may be transmitted in units smaller than a slot (1 to 13 symbols). As an example, a mini-slot may be composed of 2, 4 or 7 OFDM symbols.

A mini-slot can be started in any OFDM symbol in a slot as shown in FIG. 4. In FIG. 4, two mini-slots having different lengths (the number of OFDM symbols) are shown in one slot, but this is for illustrative purposes only, and when a plurality of mini-slots is included in one slot, the mini-slots may have the same number of OFDM symbols.

Hereinafter, resource allocation in the NR system will be described.

In the NR system, a specific number (e.g., a maximum of 4 for each of downlink and uplink) of bandwidth parts (BWPs) may be defined. A BWP (or carrier BWP) is a set of consecutive PRBs and may be represented as consecutive subsets of common RBs (CRBs). Each RB in a CRB may start with CRB0 and may be denoted by CRB1, CRB2, and the like.

Figure 5:
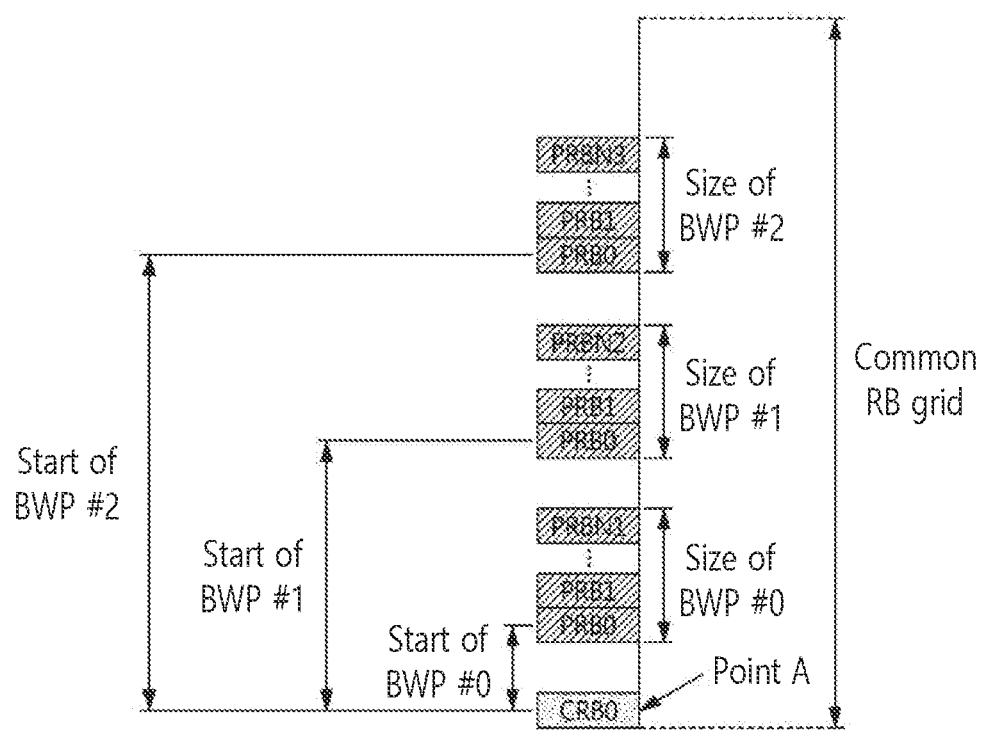
FIG. 5 is a diagram illustrating an example of a frequency allocation method and a BWP to which the technical features of the present disclosure are applicable.

FIG. 5 is a diagram illustrating an example of a frequency allocation method and BWPs to which the technical features of the present disclosure are applicable.

Referring to FIG. 5, a plurality of BWPs may be defined in a CRB grid. A reference point (which may be referred to as a common reference point, a starting point, and the like) of the CRB grid is called "point A" in NR. Point A is indicated by RMSI (i.e., SIB1). Specifically, a frequency offset between a frequency band in which an SS/PBCH block is transmitted and point A may be indicated by the RMSI. Point A corresponds to the first subcarrier of CRB0. Further, point A may be a point at which a variable "k" indicating a frequency band of an RE in NR is set to 0. A plurality of BWPs shown in FIG. 5 are configured for one cell (e.g., a primary cell (PCell)). A plurality of BWPs may be configured for each cell individually or in common.

Referring to FIG. 5, each BWP may be defined by a size and a starting point from CRB0. For example, the first BWP, i.e., BWP #0, may be defined by a starting point through an offset from CRB0, and the size of BWP #1 may be determined by a size for BWP #0. The BWPs may be defined to overlap within the entire channel bandwidth (CBW).

A specific number of BWPs (e.g., a maximum of 4 for each of downlink and uplink) may be configured for a UE. In 3GPP Release 15, even if a plurality of BWPs is configured, only a specific number (e.g., 1) of BWPs can be activated per cell for a given time. In subsequent standards, modification may be performed such that a plurality of BWPs can be activated for a given time. However, when a supplementary uplink (SUL) carrier is configured for a UE, a maximum of 4 BWPs may be additionally configured in the SUL carrier, and one BWP may be activated for a given time. The number of configurable BWPs or the number of activated BWPs may be commonly or individually configured for UL and DL. In addition, a numerology and/or a CP for DL BWPs and a numerology and/or a CP for UL BWPs may be configured for a UE through DL signaling. The UE may receive a PDSCH, a PDCCH, a channel state information (CSI) RS and/or a tracking RS (TRS) only in an active DL BWP. In addition, the UE may transmit a PUSCH and/or a physical uplink control channel (PUCCH) only in an active UL BWP.

Figure 6:
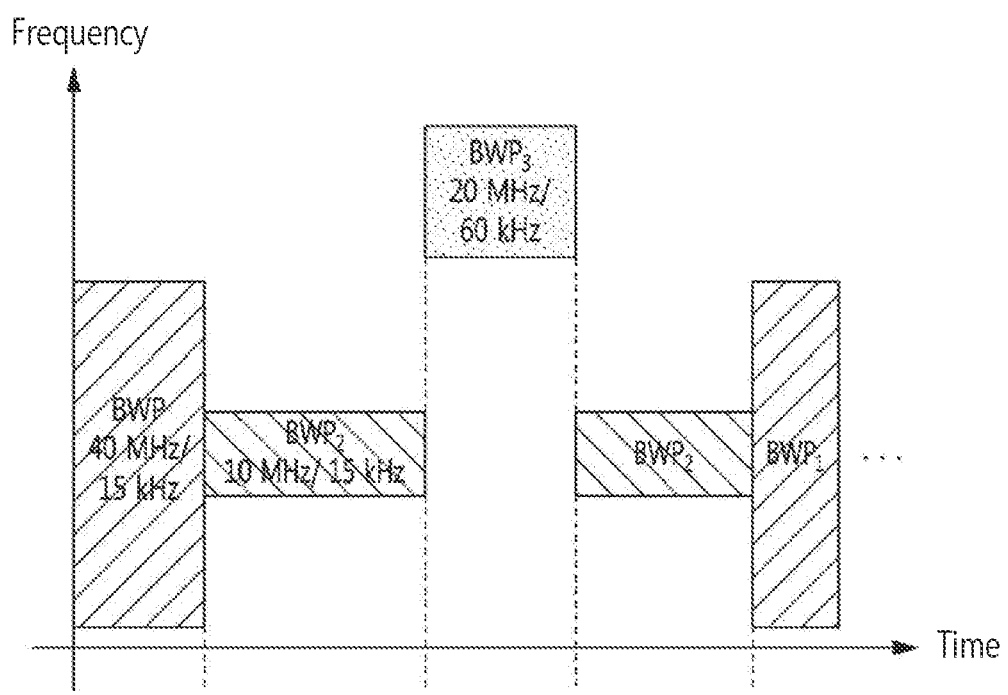
FIG. 6 is a diagram illustrating an example of multiple BWPs and a bandwidth adaptation method for transmitting BWPs while changing the BWPs to which the technical features of the present disclosure are applicable.

FIG. 6 is a diagram illustrating an example of bandwidth adaptation in which multiple BWPs to which the technical features of the present disclosure are applicable are used while being temporally changed.

In FIG. 6, a situation in which three BWPs are configured is assumed. The first BWP may span a 40 MHz band and a subcarrier spacing of 15 kHz may be applied thereto. The second BWP may span a 10 MHz band and a subcarrier spacing of 15 kHz may be applied thereto. The third BWP may span a 20 MHz band and a subcarrier spacing of 60 kHz may be applied thereto. A UE may configure at least one of the three BWPs as an active BWP and may perform UL and/or DL data communication through the active BWP.

Time resources may be indicated in a manner of indicating a time difference/offset based on a transmission time of a PDCCH for DL or UL resources allocation. For example, the starting point of a PDSCH/PUSCH corresponding to the PDCCH and the number of symbols occupied by the PDSCH/PUSCH may be indicated.

Hereinafter, sidelink will be described. The sidelink is an interface between UEs for sidelink communication and sidelink discovery. The sidelink corresponds to a PC5 interface. Sidelink communication is an AS function that enables two or more adjacent UEs to perform ProSe (proximity-based services) direct communication using E-UTRA (or NR in 5G) without passing through any network node, and sidelink discovery is an AS function that enables two or more adjacent UEs to perform ProSe direct discovery using E-UTRA (or NR) without passing through any network node.

Sidelink physical channels include a physical sidelink broadcast channel (PSBCH) carrying system and synchronization related information transmitted from a UE, a physical sidelink discovery channel (PSBCH) carrying a sidelink discovery message transmitted from a UE, a physical sidelink control channel (PSCCH) carrying a control signal for sidelink communication transmitted from a UE, and a physical sidelink shared channel (PSSCH) carrying data for sidelink communication transmitted from a UE. A sidelink physical channel is mapped to a sidelink transport channel. The PSBCH is mapped to a sidelink broadcast channel (SL-BCH). The PSDCH is mapped to a sidelink discovery channel (SL-DCH). The PSSCH is mapped to a sidelink shared channel (SL-SCH).

In sidelink, logical channels are classified into a control channel for control plane information transfer and a traffic channel for user plane information transfer. Sidelink control channels include a sidelink broadcast control channel (SBCCH) which is a sidelink channel for broadcasting sidelink system information from one UE to another UE. The SBCCH is mapped to an SL-BCH. A sidelink traffic channel includes a sidelink traffic channel (STCH) which is a point-to-multipoint channel for transmission of user information from one UE to another UE. The STCH is mapped to an SL-SCH. This channel can be used only by UEs capable of sidelink communication.

A UE supporting sidelink communication may operate in the following two modes for resource allocation. The first mode is a scheduled resource allocation mode. The scheduled resource allocation mode may be referred to as mode 1. In mode 1, the UE needs to be in RRC_CONNECTED in order to transmit data. The UE requests a transmission resource from a base station. The base station schedules transmission resources for transmission of sidelink control information (SCI) and data. The UE transmits a scheduling request (dedicated scheduling request (D-SR) or random access) to the base station and then sends a sidelink buffer status report (BSR). Based on the sidelink BSR, the base station may determine that the UE has data for sidelink communication transmission and may estimate resources required for transmission. The base station may schedule transmission resources for sidelink communication using a configured sidelink radio network temporary identity (SL-RNTI).

The second mode is a UE autonomous resource selection mode. The UE autonomous resource selection mode may be referred to as mode 2. In mode 2, a UE selects a resource from a resource pool and selects a transmission format for transmitting sidelink control information and data. There may be a maximum of 8 resource pools preconfigured for out-of-coverage operation or provided by RRC signaling for in-coverage operation. One or more ProSe per-packet priorities (PPPPs) may be connected to each resource pool. For transmission of a MAC protocol data unit (PDU), the UE selects a resource pool having one of the same PPPPs as the PPPP of a logical channel having the highest PPPP among logical channels identified in the MAC PDU. A sidelink control pool and a sidelink data pool are associated on one-to-one basis. When a resource pool is selected, the selection is valid for the entire sidelink control period. After the sidelink control period ends, the UE may re-select a resource pool.

On the other hand, there are two types of resource allocation for discovery message announcement. The first is UE autonomous resource selection, which is a resource allocation procedure in which resources for announcement of a discovery message is allocated on a non-UE specific basis. UE autonomous resource selection may be referred to as type 1. In type 1, the base station provides a resource pool configuration used for announcement of a discovery message to the UE. The corresponding configuration may be signaled by broadcasting or dedicated signaling. The UE autonomously selects a radio resource from the indicated resource pool and announces a discovery message. The UE may announce a discovery message on a randomly selected discovery resource during each discovery cycle.

The second is scheduled resource allocation, which is a resource allocation procedure in which a resource for announcing a discovery message is allocated on a UE-specific basis. The scheduled resource allocation may be referred to as type 2. In type 2, a UE in RRC_CONNECTED may request a resource for announcing a discovery message from the base station through RRC. The base station allocates resources through RRC. Resources are allocated to a resource pool configured in the UE for announcement.

Hereinafter, sidelink communication through ProSe UE-network relay will be described. ProSe UE-network relay provides a general L3 forwarding function capable of relaying all types of IP traffic between a remote UE and a network. One-to-one and one-to-many sidelink communication are used between a remote UE and a relay UE. For both the remote UE and the relay UE, only one single carrier (i.e., public safety ProSe carrier) operation is supported (i.e., Uu and PC5 need to be the same carrier for the relay/remote UE). The remote UE has been authenticated by a higher layer and may be within the coverage of the public safety ProSe carrier or out of the coverage of all supported carriers including the public safety ProSe carrier for UE-network relay discovery, (re)selection and communication. The relay UE is always within the range of EUTRAN (or NG-RAN in the case of 5G). The relay UE and the remote UE perform sidelink communication and sidelink discovery.

The base station controls whether the UE1 can serve as a ProSe UE-network relay. When the base station broadcasts information related to the ProSe UE-network relay operation, the ProSe UE-network relay operation is supported in the cell. The base station may provide transmission resources for ProSe UE-network relay discovery using broadcast signaling for RRC_IDLE and dedicated signaling for RRC_CONNECTED, and reception resources for ProSe UE-network relay discovery using broadcast signaling. In addition, the base station may broadcast a minimum and/or maximum Uu link quality (i.e., reference signal received power (RSRP)) threshold value that needs to be satisfied before the UE initiates the ProSe UE-network relay discovery procedure. In RRC_IDLE, when the base station broadcasts a transmission resource pool, the UE uses a threshold value to autonomously start or stop the ProSe UE-network relay discovery procedure. In RRC_CONNECTED, the UE uses a threshold value to determine whether it can indicate to the base station that it is a relay UE and wants to start ProSe UE-network relay discovery. If the base station does not broadcast the transmission resource pool for ProSe UE-network relay discovery, the UE may initiate a request for the ProSe UE-network relay discovery resource by dedicated signaling while considering the broadcast threshold value. When ProSe UE-network relay is started by broadcast signaling, the relay UE may perform ProSe UE-network relay discovery in RRC_IDLE. When ProSe UE-network relay is initiated by dedicated signaling, the relay UE may perform ProSe UE-network relay discovery as long as it is in RRC_CONNECTED.

For the ProSe UE-network relay operation, a relay UE that performs sidelink communication needs to be in RRC_CONNECTED. After receiving a layer-2 link establishment request or a temporary mobile group identity (TMGI) monitoring request (higher layer message) from a remote UE, the relay UE notifies the base station that it is a relay UE and intends to perform ProSe UE-network relay sidelink communication. The base station may provide resources for ProSe UE-network relay communication.

The remote UE may determine when to start monitoring for ProSe UE-network relay discovery. The remote UE may transmit a ProSe UE-network relay discovery induction message while being in an RRC_IDLE or RRC_CONNECTED state according to the configuration of resources for ProSe UE-network relay discovery. The base station may broadcast a threshold value used by the remote UE to determine whether the remote UE can transmit the ProSe UE-network relay discovery induction message in order to connect to or communicate with the relay UE. The remote UE in the RRC_CONNECTED state uses the broadcast threshold value to determine whether it can indicate that it is a remote UE and wants to participate in ProSe UE-network relay discovery and/or communication. For the ProSe UE-network relay operation, the base station may provide transmission resources using broadcast or dedicated signaling, or may provide reception resources using broadcast signaling. If RSRP exceeds the broadcast threshold value, the remote UE stops ProSe UE-network relay discovery and use of communication resources. The exact time to switch traffic from Uu to PC5 (sidelink) and vice versa depends on the higher layer.

The remote UE performs radio measurement on the PC5 interface and uses the measurement result for relay UE selection and reselection along with higher layer criteria. If PC5 link quality exceeds a configured threshold value (pre-configured or provided by the base station), the relay UE is considered to be suitable with respect to radio criteria. The remote UE selects a relay UE having the best PC5 link quality among all suitable relay UEs that satisfy higher layer criteria.

The remote UE triggers relay UE reselection when the PC5 signal strength of the current relay UE is lower than a configured signal strength threshold value or a layer-2 link release message (higher layer message) is received from the relay UE.

Figure 7:
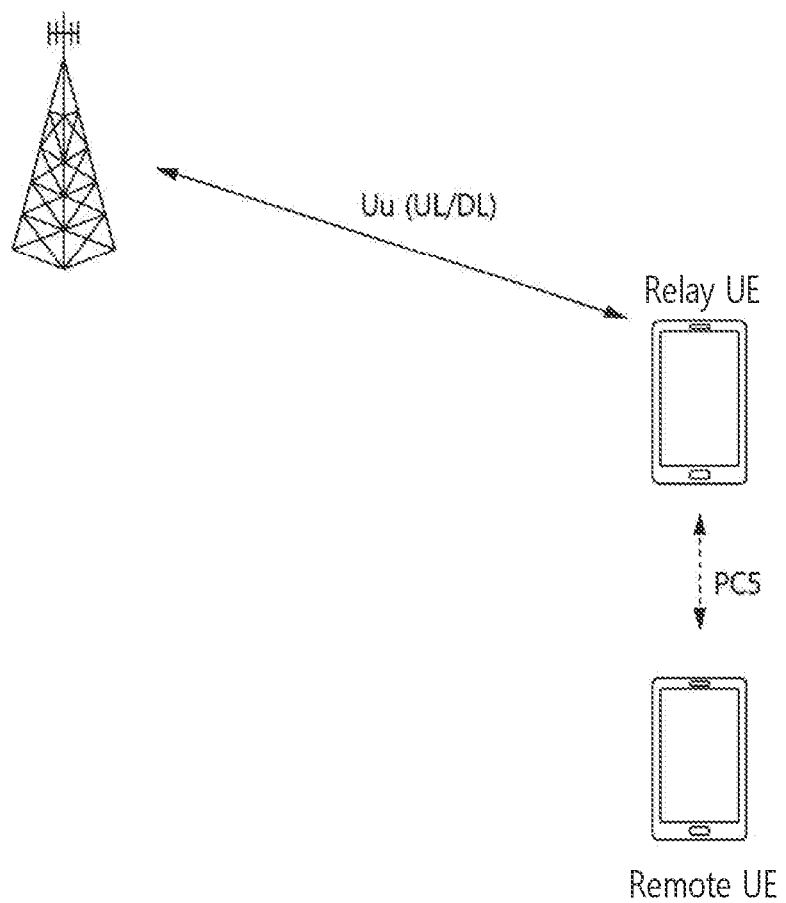
FIG. 7 is a diagram illustrating an example of bidirectional UE-network relay.

FIG. 7 is a diagram illustrating an example of bidirectional UE-network relay.

Referring to FIG. 7, the relay UE is used to relay UE-specific data from a remote UE to a base station in UL or is used to relay UE-specific data from the base station to the remote UE in DL. In this case, the remote UE is required to directly receive SIB and paging from the base station. In order to support this in the form of relay, the remote UE must have both D2D transmission and reception capabilities along with Uu reception capability.

Figure 8:
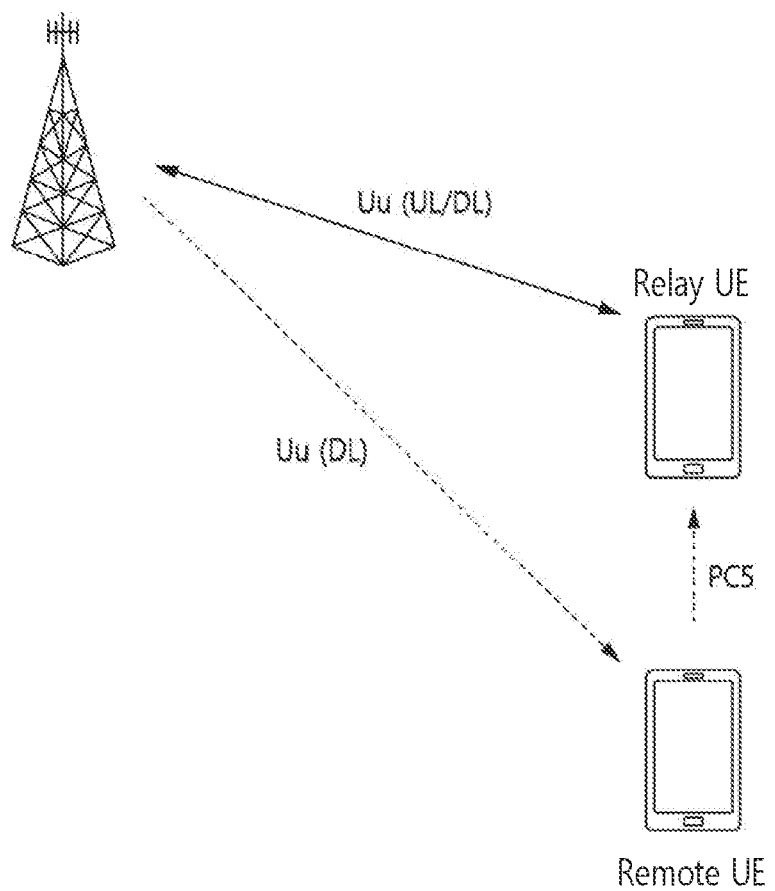
FIG. 8 is a diagram illustrating an example of unidirectional UE-network relay.

FIG. 8 is a diagram illustrating an example of unidirectional UE-network relay.

Referring to FIG. 8, a relay UE is used to relay only UL data from a remote UE. In this case, D2D transmission capability is free because both Uu and D2D use the same transmission chain, and thus there is an advantage of low cost as in enhanced MTC (eMTC). Rel-13 ProSe UE-network relay is layer-3 relay and can be enhanced to layer-2 relay to help the base station. The advantage of unidirectional relay is that the relay UE perform reception only on the PC5 interface and thus it does not suffer from a half-duplex problem of the PC5 interface.

That is, the remote UE may have D2D transmission capability or both transmission/reception capabilities according to circumstances, whereas the relay UE may be a general UE having D2D transmission/reception and Uu transmission/reception capabilities.

Meanwhile, a sidelink (SL) for D2D may be used in NR, which is radio access technology (RAT) of a 5G mobile communication system. In addition, single-beamforming and multi-beamforming can be supported in 5G NR. A network may deploy a single beam or multiple beams. Different beams may be used at different times. Regardless of whether a single beam or multiple beams are deployed, it may be necessary to indicate a resource to be monitored for control channel monitoring from the viewpoint of a UE. In particular, when multi-beam and/or repetition transmission is used, the same control channel may be transmitted multiple times from the viewpoint of the UE.

For communication in various applications corresponding to V2X (Vehicle to Everything) and URLLC scenarios in the NR system, it is necessary to transmit data stably and rapidly with almost no errors. However, when a UE moves in a direction in which a channel deteriorates in an environment in which the UE moves rapidly, there is a high possibility that data needs to be retransmitted. In the case of transmitting normal data such as eMBB (enhanced Mobile Broad Band) data, there is no problem even if retransmission occurs.

In most cases, such as V2X scenarios and URLLC scenarios, the amount of transmitted user data is not large, and thus use of some additional resources may not be a big burden. Rather, a situation in which an error occurs and latency increases due to retransmission due to the error may be worse. Therefore, in the present embodiment, the same sidelink data may be repeatedly transmitted or redundantly transmitted between UEs in the following manner. The sidelink data transmission method according to the present invention can be applied to various scenarios of URLLC as well as vehicle communication such as V2X. In particular, since sidelink transmission can be widely applied in V2X, and URLLC transmission is very important in V2X, it is important to apply URLLC to sidelink transmission.

For ultra-reliable and low latency communication (URLLC) transmission in sidelink (SL), a method different from eMBB transmission needs to be applied. Therefore, technologies for URLLC transmission may be applied to sidelink transmission.

When URLLC is applied in sidelink, an RRC configuration and a control command transmission method may be set differently in (1) a mode in which a base station controls SL and (2) a mode in which direct SL control is performed between UEs.

(1) In the case of the mode in which a base station controls SL, a semi-static configuration may be transmitted from the base station to each UE by RRC signaling, and a dynamic configuration may be transmitted from the base station to each UE through DCI.

(2) In the case of the mode in which direct SL control is performed between UEs, the semi-static configuration may be transmitted from the base station to each UE by RRC signaling and the dynamic configuration may be transmitted from a transmitting UE to a receiving UE through SL control information (SCI).

Here, the semi-static configuration (default or maximum) may include the number of repeated transmissions, time/frequency resource information, SL BWP configuration information, mini-slot length information, etc. The dynamic configuration may include resource allocation for sidelink (SL), the actual number of repeated transmissions, whether frequency hopping (FH) is applied during repeated transmission, and the like.

Meanwhile, in the case of repeated transmission in sidelink, the cases of SL unicast and SL groupcast may be considered. When SL unicast and SL groupcast are applied to a low frequency, beamforming is not used, or even if beamforming is used, the number of beams is not large because of a large beam width. However, when a high-frequency band such as mmWave is used, the beam width decreases at the time of performing SL unicast and SL groupcast, and the number of beams to be used considerably increases in the cases of SL unicast and SL groupcast. Accordingly, in the present embodiment, the following method may be used in each of SL unicast and SL groupcast.

In the case of SL unicast, if the location of a receiving UE is within one beam range, a transmitting UE may perform repeated transmission of the same sidelink data using one beam. On the other hand, when a beam needs to be changed because the location of the receiving UE is changed, the transmitting UE may repeatedly transmit the same sidelink data while changing the beam.

In the case of SL groupcast, if the positions of UEs are in one beam range, a transmitting UE may perform repeated transmission of the same sidelink data using one beam. On the other hand, when beams need to be changed because the positions of the UEs are very different, the transmitting UE may perform repeated transmission for each beam while changing the beams.

Feedback for repeated transmission may also be considered differently for unicast and groupcast.

In the case of SL unicast, a transmitting UE may receive feedback for repeated transmission from one UE. In the case of SL groupcast, the transmitting UE may receive feedback for repeated transmission from multiple UEs.

A retransmission method for UEs that have transmitted NACK for SL groupcast may also be different from the method for SL unicast. When SL groupcast is performed with the same beam, a transmitting UE may perform retransmission for all UEs including a UE that has transmitted NACK. When SL groupcast is performed while changing beams, the transmitting UE may perform retransmission only to a UE that has transmitted NACK.

In the case of repeated transmission to which frequency hopping (FH) is applied, FH considering an SL BWP may be performed. For example, when FH is used in SL repeated transmission, a transmitting UE may transmit SL data using frequencies at both ends of an actively used SL BWP.

Figure 9:
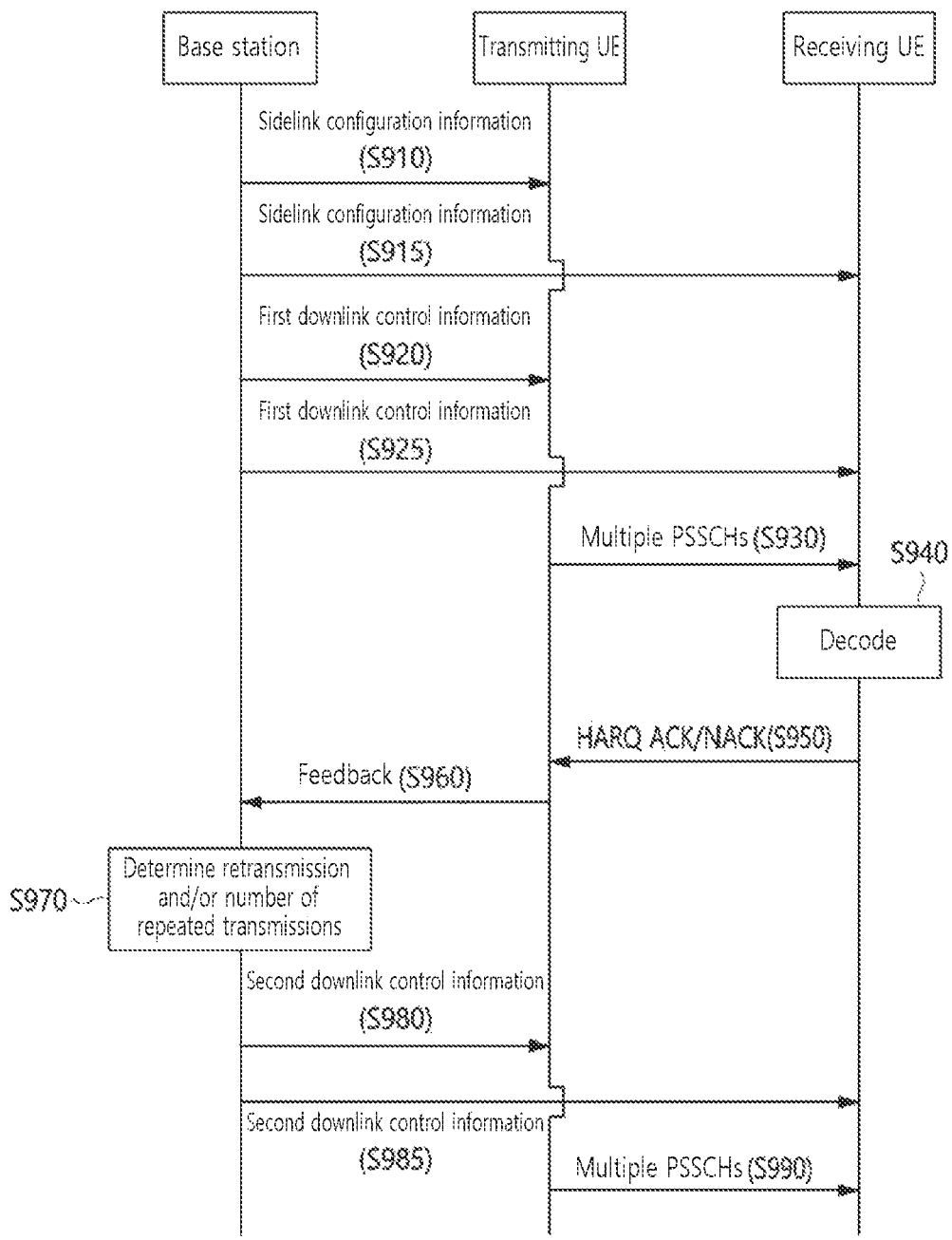
FIG. 9 is a flowchart illustrating a sidelink data transmission method according to an embodiment of the present disclosure.

FIG. 9 is a flowchart illustrating a sidelink data transmission method according to an embodiment of the present disclosure.

The embodiment of FIG. 9 may correspond to the mode in which a base station controls sidelink (SL). Referring to FIG. 9, the base station transmits sidelink configuration information to a transmitting UE through radio resource control (RRC) signaling (S910). In addition, the base station transmits the sidelink configuration information to a receiving UE through RRC signaling (S915). In this case, the sidelink configuration information transmitted through RRC signaling may be static and/or semi-static configuration information. Here, the sidelink configuration information may include system information and RRC configuration information regarding repeated transmission of SL data, and may include the default or maximum number of repeated transmissions for SL data, time/frequency resource information used for SL data transmission, SL BWP configuration information, mini-slot length information, and the like.

Meanwhile, the base station transmits first downlink control information (DCI) to the transmitting UE (S920). In addition, the base station transmits the first downlink control information to the receiving UE (S925). In this case, the first downlink control information transmitted to the transmitting UE and the receiving UE may be dynamic configuration information. Here, the first downlink control information may include resource allocation information used for actual repeated transmission, information on the number of repetitions, whether frequency hopping (FH) is applied during repeated transmission, and the like. To this end, a new field may be added to DCI.

In an embodiment, the base station may indicate the default or maximum number of repeated transmissions through RRC, that is, the sidelink configuration information, and when it is necessary to change the number of repeated transmissions, may inform each UE of the actual number of repeated transmissions through DCI. Alternatively, the base station may inform each UE of information on a difference between the default or maximum number of repeated transmissions and the actual number of repeated transmissions through DCI, that is, the first downlink control information.

The transmitting UE determines the number of repeated transmissions and transmission resources for the same SL data based on the configuration information received from the base station, configures a plurality of PSSCHs according to the determination results, and transmits the same to the receiving UE (S930). Hereinafter, a plurality of PSSCHs will be used as terms having the same meaning as PSSCH repetitions. That is, "a plurality of PSSCHs" used in the present specification can be replaced with "PSSCH repetitions" in embodiments.

For example, when the base station determines that beamforming will be used for transmission of the plurality of PSSCHs, the transmitting UE may form multiple beams based on beamforming related information included in an RRC message and/or DCI received from the base station and repeatedly transmit SL data. In this case, SL unicast or SL groupcast may be performed depending on the number of receiving UEs.

As another example, when the base station determines that FH will be used for transmission of the plurality of PSSCHs, the transmitting UE may perform frequency hopping (FH) in the frequency domain at the time of transmitting SL data based on FH related information included in the RRC message and/or DCI received from the base station. As an example, when the transmitting UE repeatedly transmits the same SL data to a receiving UE, frequency hopping may be performed in the frequency domain in units of slots or mini-slots. For example, the transmitting UE transmits SL data to the receiving UE using a first frequency in a first mini-slot and transmit the same data as the SL data to the receiving UE using a second frequency according to frequency hopping in a second mini-slot temporally adjacent to the first mini-slot. Here, the data may be referred to as PSSCH data. Alternatively, the data may be referred to as URLLC-related data.

The range of frequencies used for frequency hopping may vary depending on the size of the SL BWP. For example, a transmitting UE may use frequency resources corresponding to both ends of the SL BWP for the FH in order to maximize the frequency diversity effect. When a large amount of frequency resources (resource blocks (RBs)) is used for SL data transmission, multiple frequency resources can be used while increasing the number of RBs from the end of the SL BWP. For example, when BWP #0 is activated in FIG. 5, PRB0 and PRBN1 may be used for FH. When a larger amount of frequency resources is required for SL data transmission, PRB0, PRB1, PRBN1-1 and PRBN1 may be used for FH.

When there is a lot of URLLC traffic to which FH is applied, it is necessary to prevent frequency resource collision. In particular, when different SL BWPs are configured for multiple UEs and thus resources for performing FH overlap, it is necessary to adjust the range of FH such that frequency resource collision does not occur. Therefore, when FH is applied, the frequency resource at the end of the SL BWP can be used by default, but it can be changed if necessary. Information related to this, for example, FH related information may be semi-statically set by the base station through higher layer RRC signaling or the like and signaled to a UE. In addition, FH related control information may be included in DCI or SCI and transmitted on a PDCCH or a PSCCH.

For example, when SL BWPs overlap between multiple UEs and frequency resources overlap at the time of using FH, different FH patterns may be used between UEs. Further, the FH range may be adjusted. For example, if the frequency resources at both ends of an SL BWP are being used by a specific UE, the UE may use the inner frequency resources. For example, when BWP #0 is activated in both the first UE and the second UE, the first UE transmits first data through PRB0 in the first mini-slot and transmits the same data as the first data through PRB1 in the second mini-slot in FIG. 5, the second UE may transmit second data through PRB1 in the first mini-slot and transmit the same data as the second data through PRBN1-1 in the second mini-slot. Alternatively, the second UE may transmit the second data through PRBN1 in the first mini-slot and transmit the same data as the second data through PRB0 in the second mini-slot. Alternatively, the second UE may transmit the second data through PRBN1-1 in the first mini-slot and transmit the same data as the second data through PRB1 in the second mini-slot. In this way, the second UE may perform frequency hopping using a frequency resource different from that of the first UE, or may perform frequency hopping in a pattern different from that of the first UE.

Meanwhile, when overlapping or repeated transmission occurs over several slots, a frequency different from the frequency used in the previous slot may be used in the next slot. That is, inter-slot FH may be applied. Further, in order to reduce complexity, FH may not be performed within one mini-slot. When multiple mini-slots are used to repeatedly transmit the same data, FH may be applied. For example, a base station or a transmitting UE does not apply FH when channel information (a channel gain for each frequency, etc.) is reliable, and allocates a frequency resource with a good channel condition to control data to be repeatedly transmitted. For example, the base station or the transmitting UE may check a channel state based on a CQI value, may not apply FH if the channel state is good, and may apply FH when the channel condition is not good or channel information is not ascertained or unreliable. The transmitting UE may repeatedly transmit the same data using an optimal frequency resource when the channel condition is good.

In repeated transmission, very important information may be transmitted repeatedly in the frequency domain and the time domain.

For example, the transmitting UE may allocate a plurality of frequency resources and transmit the same information multiple times through frequency resources. For example, when BWP #0 is activated in FIG. 5, the transmitting UE may transmit the first SL data by mapping the same to PRB0 and PRB1. This method may be more suitable in an mm-Wave environment in which there are a large amount of frequency resources and a small amount of time resources.

As another example, the transmitting UE may allocate a plurality of time resources and transmit the same information multiple times through the resources. For example, the transmitting UE may transmit the first SL data through the first mini-slot and transmit the same data as the first SL data through the second mini-slot.

As another example, the transmitting UE may transmit the same information multiple times using both a frequency resource and a time resource. For example, when BWP #0 is activated in FIG. 5, the transmitting UE may map the first SL data to PRB0 and PRB1, transmit the same through the first mini-slot, map the same data as the first SL data to PRBN1-1 and PRBN1, and then transmit the same through the second mini-slot.

When a plurality of PSSCHs for the same SL data is received from the transmitting UE, a receiving UE decodes the same (S940) and transmits HARQ ACK/NACK for the plurality of PSSCHs to the transmitting UE based on a decoding result (S950). Meanwhile, although FIG. 9 illustrates that the receiving UE transmits HARQ ACK/NACK based on the decoding result in step S940 to the transmitting UE, the receiving UE may directly transmit HARQ ACK/NACK to the base station instead of the transmitting UE.

In one embodiment, when the receiving UE transmits HARQ ACK/NACK to the transmitting UE, the transmitting UE may feed back a result of repeated transmission of the SL data to the base station (S960). The base station may determine whether to retransmit the SL data and/or the number of repeated transmissions for the next SL data to be transmitted based on the feedback received from the transmitting UE (S970).

In another embodiment, when the receiving UE transmits HARQ ACK/NACK to the base station, the base station may determine whether to retransmit the SL data and/or the number of repeated transmissions for the next SL data to be transmitted based on HARQ ACK/NACK received from the receiving UE (S970).

The base station transmits second downlink control information including whether to retransmit the SL data and/or the number of repeated transmissions for the next SL data to be transmitted determined in step S970 to the transmitting UE (S980). In addition, the base station transmits the second downlink control information including whether to retransmit the SL data and/or the number of repeated transmissions for the next SL data to be transmitted determined in step S970 to the receiving UE (S985). In this case, downlink control information transmission of step S980 and downlink control information transmission of step S985 may be simultaneously performed. The transmitting UE may configure a plurality of PSSCHs for the corresponding SL data according to the downlink control information and transmit the same to the receiving UE (S990).

In FIG. 9, the transmitting UE receives from the base station whether to retransmit the SL data and/or the number of repeated transmissions for the next SL data to be transmitted. However, in another embodiment, when the transmitting UE receives HARQ ACK/NACK for a plurality of PSSCHs from the receiving UE, the transmitting UE may determine whether to retransmit the corresponding SL data based on the received HARQ ACK/NACK. For example, upon reception of NACK for a plurality of PSSCHs from the receiving UE, the transmitting UE may retransmit the corresponding data in the originally set method. This method is more suitable for low latency.

For example, when the receiving UE receives a plurality of PSSCHs for the first SL data from the transmitting UE, the receiving UE may decodes the same, transmit HARQ ACK for a successfully received PSSCH, and transmit HARQ NACK for a PSSCH having an error. In this case, the transmitting UE or the base station may determine the number of repeated transmission of the second SL data based on the number of received HARQ ACKs and/or the number of received HARQ NACKs.

In the present embodiment, the transmitting UE or the base station may assume that a channel condition is very good if the number of ACKs after repeated transmission is greater than a reference value or reference ratio, and reduce the number of repetitions at the time of transmitting the next data in a similar channel environment. On the other hand, the transmitting UE or the base station may assume that the channel condition is not good if the number of ACKs after repeated transmission is less than the reference value or the reference ratio, and increase the number of repetitions at the time of transmitting the next data in a similar channel environment.

For example, when the transmitting UE or the base station receives HARQ ACKs greater than or equal to the reference value for a plurality of PSSCHs from the receiving UE, the transmitting UE or the base station may reduce the number of repeated transmissions for the second SL data to be lower than the number of repeated transmissions for the first SL data if the second SL data needs to be repeatedly transmitted in a similar channel environment as when the first SL data is repeatedly transmitted. As another example, when the transmitting UE or the base station receives HARQ ACKs less than the reference value for a plurality of PSSCHs from the receiving UE, the transmitting UE or the base station may increase the number of repeated transmissions for the second SL data to be greater than the number of repeated transmissions for the first SL data if the second SL data needs to be repeatedly transmitted in a similar channel environment as when the first SL data is repeatedly transmitted. In this case, a parameter indicating how many initial transmissions is required before the number of repeated transmissions is updated may be transmitted from the base station to each UE through RRC signaling. For example, when the parameter for update of the number of repeated transmissions is set to "2", the transmitting UE may repeatedly transmit the first SL data and the second SL data by the default number of repeated transmissions, and then determine the number of repetitions for the third SL data based on the number of HARQ ACKs and/or NACKs for the first SL data and/or the second SL data.

The transmitting UE may change the number of repeated transmissions thereafter within a range set by RRC signaling in real time. The corresponding information may be included in SCI and transmitted to the receiving UE. For example, the base station may initially set several numbers of repeated transmissions through RRC and then transmit 1-bit information indicating up and down of the number of repeated transmissions through DCI. For example, the base station may set the number of repeated transmissions to (2, 4, 6, 8) through RRC and set the default number of repeated transmissions to "2". In this case, when the base station indicates "up" for the number of repeated transmissions through DCI, the transmitting UE may change the default number of repeated transmissions from "2" to "4".

Figure 10:
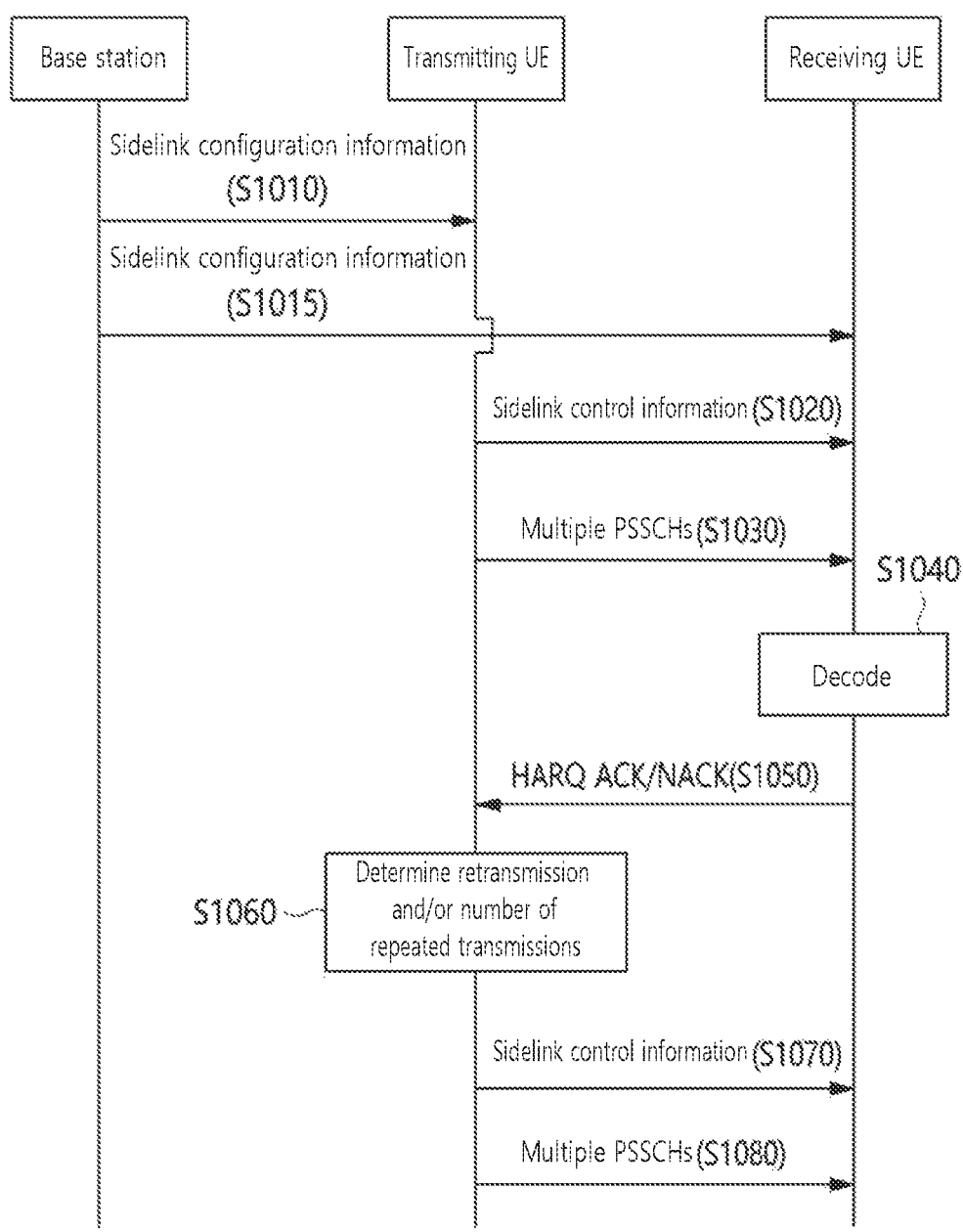
FIG. 10 is a flowchart illustrating a sidelink data transmission method according to another embodiment of the present disclosure.

FIG. 10 is a flowchart illustrating a sidelink data transmission method according to another embodiment of the present disclosure.

The embodiment of FIG. 10 may correspond to the mode in which direct SL control is performed between UEs. Referring to FIG. 10, a base station transmits sidelink configuration information to a transmitting UE through RRC signaling (S1010). In addition, the base station transmits the sidelink configuration information to a receiving UE through RRC signaling (S1015). In this case, the sidelink configuration information transmitted through RRC signaling may be static and/or semi-static configuration information. Here, the sidelink configuration information may include system information and RRC configuration information regarding repeated transmissions of SL data, and may include a default or maximum number of repeated transmissions for SL data, time/frequency resource information used for transmission of the SL data, SL BWP configuration information, mini-slot length information, and the like.

The transmitting UE may transmit sidelink control information (SCI) to a receiving UE (S1020). In this case, the information transmitted through the SCI may be information about dynamic configuration. Here, the sidelink control information may include resource allocation information used for actual repeated transmission, information on the number of repetitions, whether frequency hopping (FH) is applied during repeated transmission, and the like. To this end, a new field may be added to the SCI.

In the present embodiment, the base station may inform the transmitting UE and the receiving UE of the default or maximum number of repeated transmissions through RRC, and the transmitting UE may inform the receiving UE of the number of actual repeated transmission when the number of repeated transmissions needs to be changed. Alternatively, the transmitting UE may inform the receiving UE of information on a difference between the default or maximum number of repeated transmissions and the actual number of repeated transmissions through SCI.

The transmitting UE determines the number of repeated transmissions and transmission resources for the same SL data based on the configuration information received from the base station, configures a plurality of PSSCHs according to the determination results, and transmits the same to the receiving UE (S1030).

For example, when it is determined that beamforming will be used for transmission of the plurality of PSSCHs, the transmitting UE may configure sidelink control information (SCI) based on beamforming related information included in an RRC message received from the base station, transmit the same to the receiving UE, and form multiple beams to repeatedly transmit SL data. In this case, SL unicast or SL groupcast may be performed depending on the number of receiving UEs.

As another example, when it is determined that frequency hopping (FH) will be used for transmission of the plurality of PSSCHs, the transmitting UE may configure SCI based on FH-related information included in the RRC message received from the base station, transmit the same to the receiving UE, and perform FH in the frequency domain at the time of transmitting SL data. The method of applying FH during SL data transmission may be the same as that of the embodiment of FIG. 9 or FIG. 10.

When the receiving UE receives a plurality of PSSCHs for the same SL data from the transmitting UE, the receiving UE decodes the same (S1040) and transmits HARQ ACK/NACK for the plurality of PSSCHs to the transmitting UE based on the decoding result (S1050).

Upon reception of HARQ ACK/NACK for the plurality of PSSCHs from the receiving UE, the transmitting UE determines whether to retransmit the corresponding SL data and/or the number of repeated transmissions of the next SL data based on HARQ ACK/NACK (S1060). For example, upon reception of a plurality of PSSCHs for the first SL data from the transmitting UE, the receiving UE may transmit HARQ ACK for a successfully received PSSCH, and transmit HARQ NACK for a PSSCH having an error. In this case, the transmitting UE may determine the number of repeated transmissions for the second SL data based on the number of received HARQ ACKs and/or the number of received HARQ NACKs.

When the number of repeated transmissions is changed, the transmitting UE may transmit sidelink control information (SCI) including dynamic configuration information reflecting the change in the number of repeated transmissions to the receiving UE (S1070), configure a plurality of PSSCHs based on the dynamic configuration information, and repeatedly transmit the PSSCHs to the receiving UE (S1080).

Figure 11:
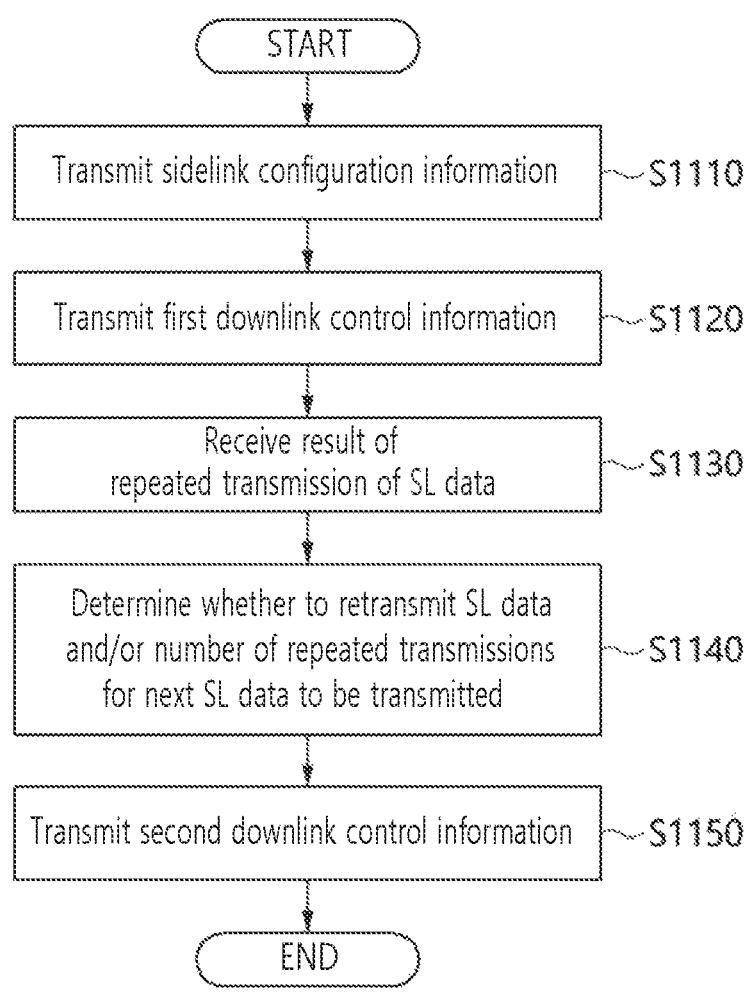
FIG. 11 shows an operation sequence of a base station in the sidelink data transmission method according to the embodiment FIG. 9.

FIG. 11 shows an operation sequence of a base station in the sidelink data transmission method according to the embodiment of FIG. 9.

Referring to FIG. 11, the base station transmits sidelink configuration information to a transmitting UE and a receiving UE through RRC signaling (S1110). In this case, the sidelink configuration information transmitted through RRC signaling may be static and/or semi-static configuration information. Here, the sidelink configuration information may include system information and RRC configuration information for repeated transmission of SL data, and may include a default or maximum number of repeated transmissions for SL data, time/frequency resource information used for SL data transmission, SL BWP configuration information, mini-slot length information, and the like.

In addition, the base station transmits first downlink control information (DCI) to the transmitting UE and the receiving UE (S1120). In this case, the first downlink control information may be dynamic configuration information, and may include resource allocation information, information on the actual number of repeated transmissions, whether FH is applied during repeated transmission, and the like. To this end, a new field may be added to the DCI.

In one embodiment, the base station may indicate the default or maximum number of repeated transmissions through RRC, that is, the sidelink configuration information, and when it is necessary to change the number of repeated transmissions, may inform each UE of the actual number of repeated transmissions through DCI. Alternatively, the base station may inform each UE of information on a difference between the default or maximum number of repeated transmissions and the actual number of repeated transmissions through DCI.

The base station receives a result of repeated transmission of the SL data from the transmitting UE (S1130). Here, the transmitting UE may determine the number of repeated transmissions and transmission resource for the same SL data based on the configuration information received from the base station, configure a plurality of PSSCHs according to the determination results, and transmit the PSSCHs to the receiving UE. Upon reception of the plurality of PSSCHs for the same SL data from the transmitting UE, the receiving UE decodes the PSSCHs and transmits HARQ ACK/NACK for the PSSCHs to the transmitting UE based on the decoding result. The transmitting UE feeds back the result of repeated transmission of the SL data to the base station, and the base station receives this result from the transmitting UE. Meanwhile, HARQ ACK/NACK for the plurality of PSSCHs may be transmitted from the receiving UE to the base station. Although not shown in FIG. 11, the base station may receive HARQ ACK/NACK for repeated SL data transmission from the receiving UE instead of receiving the result of repeated SL data transmission from the transmitting UE in step S1130.

The base station determines whether to retransmit the SL data and/or the number of repeated transmissions for the next SL data to be transmitted based on the feedback received from the transmitting UE or the HARQ ACK/NACK received from the receiving UE (S1140).

In addition, the base station transmits second downlink control information including whether the SL data is retransmitted and/or the number of repeated transmissions for the next SL data to be transmitted to the transmitting UE and the receiving UE (S1150).

In the present embodiment, the base station may assume that a channel condition is very good if the number of ACKs after repeated transmission is greater than a reference value or a reference ratio, and reduce the number of repetitions at the time of transmitting the next data in a similar channel environment. On the other hand, the base station may assume that the channel condition is not good if the number of ACKs after repeated transmission is less than the reference value or the reference ratio, and increase the number of repetitions at the time of transmitting the next data in a similar channel environment.

For example, when the transmitting UE or the base station receives HARQ ACKs greater than or equal to the reference value for a plurality of PSSCHs from the receiving UE, the transmitting UE or the base station may reduce the number of repeated transmissions for the second SL data to be lower than the number of repeated transmissions for the first SL data if the second SL data needs to be repeatedly transmitted in a similar channel environment as when the first SL data is repeatedly transmitted. As another example, when the transmitting UE or the base station receives HARQ ACKs less than the reference value for a plurality of PSSCHs from the receiving UE, the transmitting UE or the base station may increase the number of repeated transmissions for the second SL data to be greater than the number of repeated transmissions for the first SL data if the second SL data needs to be repeatedly transmitted in a similar channel environment as when the first SL data is repeatedly transmitted. In this case, a parameter indicating how many initial transmissions is required before the number of repeated transmissions is updated may be transmitted from the base station to each UE through RRC signaling.

Figure 12:
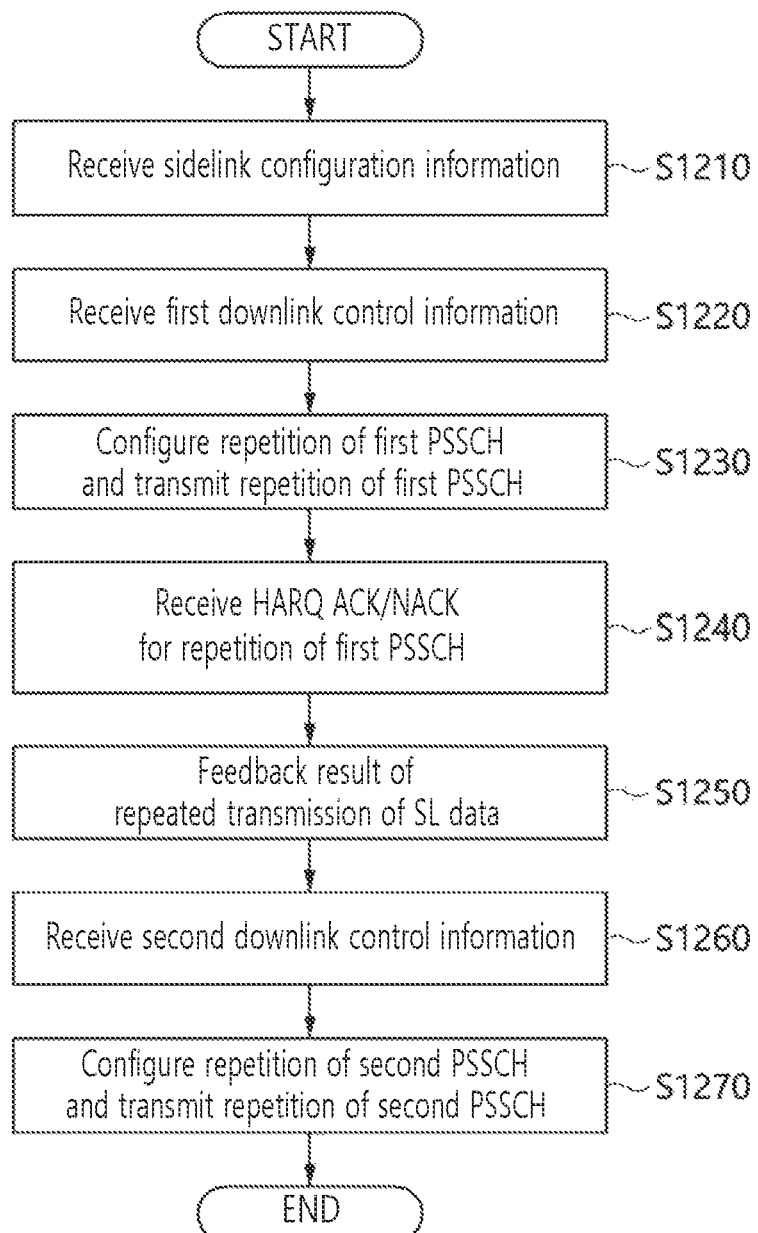
FIG. 12 shows an operation sequence of a transmitting UE in the sidelink data transmission method according to the embodiment FIG. 9.

FIG. 12 shows an operation sequence of a transmitting UE in the sidelink data transmission method according to the embodiment of FIG. 9.

Referring to FIG. 12, the transmitting UE receives sidelink configuration information from a base station through RRC signaling (S1210). In this case, the sidelink configuration information transmitted through RRC signaling may be static and/or semi-static configuration information. Here, the sidelink configuration information may include system information and RRC configuration information for repeated transmission of SL data, and may include a default or maximum number of repeated transmissions for SL data, time/frequency resource information used for SL data transmission, SL BWP configuration information, mini-slot length information, and the like.

In addition, the transmitting UE receives first downlink control information (DCI) from the base station (S1220). In this case, the first downlink control information may be dynamic configuration information. Here, the first downlink control information may include resource allocation information, information on the actual number of repeated transmissions, whether FH is applied during repeated transmission, and the like. To this end, a new field may be added to DCI.

In one embodiment, the base station may indicate the default or maximum number of repeated transmissions through RRC, that is, the sidelink configuration information, and when it is necessary to change the number of repeated transmissions, may inform each UE of the actual number of repeated transmissions through DCI, that is, the first downlink control information. Alternatively, the base station may inform each UE of information on a difference between the default or maximum number of repeated transmissions and the actual number of repeated transmissions through the first downlink control information.

The transmitting UE determines the number of repeated transmissions and transmission resources for the same SL data based on the configuration information received from the base station, configures repetition of a first PSSCH according to the determination results, and transmit the same to a receiving UE (S1230).

For example, when the base station determines that beamforming will be used for repeated transmission of the first PSSCH, the transmitting UE may form multiple beams based on beamforming related information included in an RRC message and/or DCI received from the base station and repeatedly transmit SL data. In this case, SL unicast or SL groupcast may be performed depending on the number of receiving UEs.

As another example, when the base station determines that FH will be used for repeated transmission of the first PSSCH, the transmitting UE may perform frequency hopping (FH) in the frequency domain at the time of transmitting SL data based on FH related information included in the RRC message and/or DCI received from the base station. As an example, when the transmitting UE repeatedly transmits the same SL data to the receiving UE, frequency hopping may be performed in the frequency domain in units of slots or mini-slots. For example, the transmitting UE transmits SL data to the receiving UE using a first frequency in a first mini-slot and transmit the same data as the SL data to the receiving UE using a second frequency according to frequency hopping in a second mini-slot temporally adjacent to the first mini-slot. Here, the data may be referred to as PSSCH data. Alternatively, the data may be referred to as URLLC-related data.

The range of frequencies used for frequency hopping may vary depending on the size of the SL BWP. For example, a transmitting UE may use frequency resources corresponding to both ends of the SL BWP for the FH in order to maximize the frequency diversity effect. When a large amount of frequency resources (resource blocks (RBs)) is used for SL data transmission, multiple frequency resources can be used while increasing the number of RBs from the end of the SL BWP. For example, when BWP #0 is activated in FIG. 5, PRB0 and PRBN1 may be used for FH. When a larger amount of frequency resources is required for SL data transmission, PRB0, PRB1, PRBN1-1 and PRBN1 may be used for FH.

When there is a lot of URLLC traffic to which FH is applied, it is necessary to prevent frequency resource collision. In particular, when different SL BWPs are configured for multiple UEs and thus resources for performing FH overlap, it is necessary to adjust the range of FH such that frequency resource collision does not occur. Therefore, when FH is applied, the frequency resource at the end of the SL BWP can be used by default, but it can be changed if necessary. Information related to this, for example, FH related information may be semi-statically set by the base station through higher layer RRC signaling or the like and signaled to a UE. In addition, FH related control information may be included in DCI or SCI and transmitted on a PDCCH or a PSCCH.

For example, when SL BWPs overlap between multiple UEs and frequency resources overlap at the time of using FH, different FH patterns may be used between UEs. Further, the FH range may be adjusted. For example, if the frequency resources at both ends of an SL BWP are being used by a specific UE, the UE may use the inner frequency resources. For example, when BWP #0 is activated in both the first UE and the second UE, the first UE transmits first data through PRB0 in the first mini-slot and transmits the same data as the first data through PRB1 in the second mini-slot in FIG. 5, the second UE may transmit second data through PRB1 in the first mini-slot and transmit the same data as the second data through PRBN1-1 in the second mini-slot. Alternatively, the second UE may transmit the second data through PRBN1 in the first mini-slot and transmit the same data as the second data through PRB0 in the second mini-slot. Alternatively, the second UE may transmit the second data through PRBN1-1 in the first mini-slot and transmit the same data as the second data through PRB1 in the second mini-slot. In this way, the second UE may perform frequency hopping using a frequency resource different from that of the first UE, or may perform frequency hopping in a pattern different from that of the first UE.

Meanwhile, when overlapping or repeated transmission occurs over several slots, a frequency different from the frequency used in the previous slot may be used in the next slot. That is, inter-slot FH may be applied. Further, in order to reduce complexity, FH may not be performed within one mini-slot. When multiple mini-slots are used to repeatedly transmit the same data, FH may be applied. For example, a base station or a transmitting UE does not apply FH when channel information (a channel gain for each frequency, etc.) is reliable, and allocates a frequency resource with a good channel condition to control data to be repeatedly transmitted. For example, the base station or the transmitting UE may check a channel state based on a CQI value, may not apply FH if the channel state is good, and may apply FH when the channel condition is not good or channel information is not ascertained or unreliable. The transmitting UE may repeatedly transmit the same data using an optimal frequency resource when the channel condition is good.

In repeated transmission, very important information may be transmitted repeatedly in the frequency domain and the time domain.

For example, the transmitting UE may allocate a plurality of frequency resources and transmit the same information multiple times through frequency resources. For example, when BWP #0 is activated in FIG. 5, the transmitting UE may transmit the first SL data by mapping the same to PRB0 and PRB1. This method may be more suitable in an mm-Wave environment in which there are a large amount of frequency resources and a small amount of time resources.

As another example, the transmitting UE may allocate a plurality of time resources and transmit the same information multiple times through the resources. For example, the transmitting UE may transmit the first SL data through the first mini-slot and transmit the same data as the first SL data through the second mini-slot.

As another example, the transmitting UE may transmit the same information multiple times using both a frequency resource and a time resource. For example, when BWP #0 is activated in FIG. 5, the transmitting UE may map the first SL data to PRB0 and PRB1, transmit the same through the first mini-slot, map the same data as the first SL data to PRBN1-1 and PRBN1, and then transmit the same through the second mini-slot.

Upon reception of repetition of the first PSSCH for the same SL data from the transmitting UE, the receiving UE decodes the same and transmits HARQ ACK/NACK for repetition of the first PSSCH to the transmitting UE or the base station based on the decoding result. Here, when the receiving UE transmits HARQ ACK/NACK to the transmitting UE, the transmitting UE receives HARQ ACK/NACK for repetition of the first PSSCH from the receiving UE (S1240). Here, the transmitting UE feeds back a result of repeated transmission of the SL data to the base station (S1250).

On the other hand, when the receiving UE transmits HARQ ACK/NACK to the base station, the transmitting UE does not need to receive HARQ ACK/NACK from the receiving UE and feed the same back to the base station, and thus steps S1240 and S1250 in FIG. 12 may be omitted.

In addition, the transmitting UE receives second downlink control information including whether to retransmit the SL data and/or the number of repeated transmissions for the next SL data to be transmitted from the base station (S1260).

The transmitting UE configures repetition of a second PSSCH for the corresponding SL data according to the second downlink control information received from the base station and transmits the same to the receiving UE (S1270).

In FIG. 12, the transmitting UE receives from the base station whether to retransmit the SL data and/or the number of repeated transmissions for the next SL data to be transmitted. However, when the transmitting UE receives feedback for repetition of the first PSSCH from the receiving UE, the transmitting UE may determine whether to retransmit the corresponding SL data based on the feedback. For example, upon reception of NACK for repetition of the PSSCH from the receiving UE, the transmitting UE may retransmit the corresponding data in the originally set method. This method is more suitable for low latency.

For example, when the receiving UE receives repetition of the first PSSCH for the first SL data from the transmitting UE, the receiving UE may decode the same, transmit HARQ ACK for a successfully received PSSCH, and transmit HARQ NACK for a PSSCH having an error. In this case, the transmitting UE or the base station may determine the number of repeated transmission of the second SL data based on the number of received HARQ ACKs and/or the number of received HARQ NACKs.

In the present embodiment, the transmitting UE may assume that a channel condition is very good if the number of ACKs after repeated transmission is greater than a reference value or reference ratio, and reduce the number of repetitions at the time of transmitting the next data in a similar channel environment. On the other hand, the transmitting UE or the base station may assume that the channel condition is not good if the number of ACKs after repeated transmission is less than the reference value or the reference ratio, and increase the number of repetitions at the time of transmitting the next data in a similar channel environment.

For example, when the transmitting UE receives HARQ ACKs greater than or equal to the reference value for repetition of the first PSSCH from the receiving UE, the transmitting UE may reduce the number of repeated transmissions for the second SL data to be lower than the number of repeated transmissions for the first SL data if the second SL data needs to be repeatedly transmitted in a similar channel environment as when the first SL data is repeatedly transmitted. As another example, when the transmitting UE or the base station receives HARQ ACKs less than the reference value for repetition of the first PSSCH from the receiving UE, the transmitting UE or the base station may increase the number of repeated transmissions for the second SL data to be greater than the number of repeated transmissions for the first SL data if the second SL data needs to be repeatedly transmitted in a similar channel environment as when the first SL data is repeatedly transmitted. In this case, a parameter indicating how many initial transmissions is required before the number of repeated transmissions is updated may be transmitted from the base station to each UE through RRC signaling. For example, when the parameter for update of the number of repeated transmissions is set to "2", the transmitting UE may repeatedly transmit the first SL data and the second SL data by the default number of repeated transmissions, and then determine the number of repetitions for the third SL data based on the number of HARQ ACKs and/or NACKs for the first SL data and/or the second SL data.

The transmitting UE may change the number of repeated transmissions thereafter within a range set by RRC signaling in real time. The corresponding information may be included in SCI and transmitted to the receiving UE. For example, the base station may initially set several numbers of repeated transmissions through RRC and then transmit 1-bit information indicating up and down of the number of repeated transmissions through DCI. For example, the base station may set the number of repeated transmissions to (2, 4, 6, 8) through RRC and set the default number of repeated transmissions to "2". In this case, when the base station indicates "up" for the number of repeated transmissions through DCI, the transmitting UE may change the default number of repeated transmissions from "2" to "4".

Figure 13:
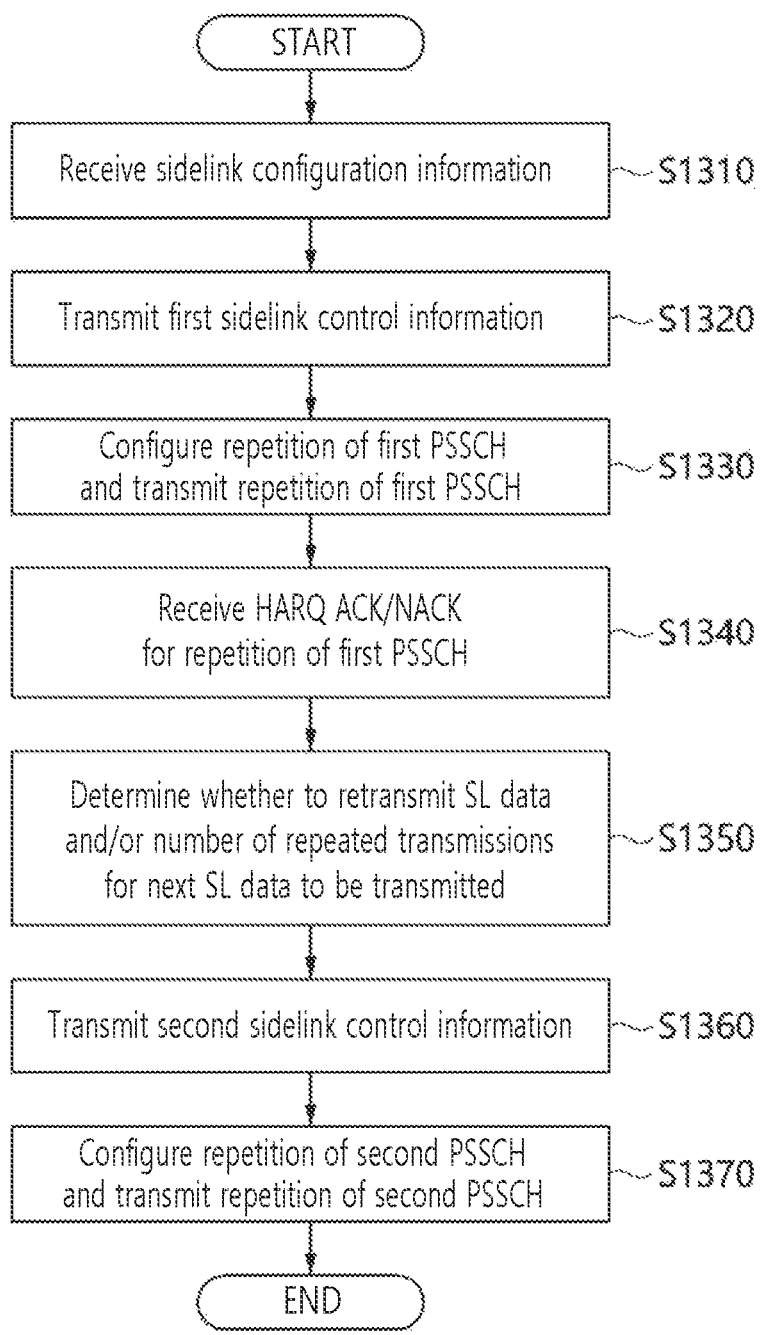
FIG. 13 shows an operation sequence of a transmitting UE in the sidelink data transmission method according to the embodiment FIG. 10.

FIG. 13 shows an operation sequence of a transmitting UE in the sidelink data transmission method according to the embodiment of FIG. 10.

Referring to FIG. 13, the transmitting UE receives sidelink configuration information from a base station through RRC signaling (S1310). In this case, the sidelink configuration information received through RRC signaling may be static and/or semi-static configuration information. Here, the sidelink configuration information may include system information and RRC configuration information regarding repeated transmissions of SL data, and may include a default or maximum number of repeated transmissions for SL data, time/frequency resource information used for transmission of the SL data, SL BWP configuration information, mini-slot length information, and the like.

The transmitting UE may transmit first sidelink control information (SCI) to a receiving UE (S1320). In this case, the first sidelink control information may be information on dynamic configuration. Here, the first sidelink control information may include resource allocation information used for actual repeated transmission, information on the number of repetitions, whether frequency hopping (FH) is applied during repeated transmission, and the like. To this end, a new field may be added to DCI.

In the present embodiment, the base station may inform the transmitting UE and the receiving UE of the default or maximum number of repeated transmissions through RRC, that is, the sidelink configuration information, and the transmitting UE may inform the receiving UE of the actual number of repeated transmissions through SCI when it is necessary to change the number of repeated transmissions. Alternatively, the transmitting UE may inform the receiving UE of information on a difference between the default or maximum number of repeated transmissions and the actual number of repeated transmissions through SCI.

The transmitting UE determines the number of repeated transmissions and transmission resources for the same SL data based on the configuration information received from the base station, configures repetition of a first PSSCH according to the determination results, and transmit the same to the receiving UE (S1330).

For example, when it is determined that beamforming will be used for transmission of repetition of the first PSSCH, the transmitting UE may configure SCI based on beamforming related information included in an RRC message received from the base station, transmit the SCI to the receiving UE, and form multiple beams to repeatedly transmit SL data. In this case, SL unicast or SL groupcast may be performed depending on the number of receiving UEs.

As another example, when it is determined that FH will be used for repeated transmission of the first PSSCH, the transmitting UE may configure SCI based on FH related information included in an RRC message received from the base station, transmit the same to the receiving UE, and perform FH in the frequency domain at the time of transmitting SL data. The method of applying FH during SL data transmission may be the same as that of the embodiment of FIG. 9 or FIG. 10.

The transmitting UE receives HARQ ACK/NACK for repeated transmission of the first PSSCH from the receiving UE (S1340).

Upon reception of HARQ ACK/NACK for the repeated transmission of the first PSSCH from the receiving UE, the transmitting UE determines whether to retransmit the corresponding SL data and/or the number of repeated transmissions of the next SL data based thereon (S1350). For example, upon reception of repetition of the first PSSCH for first SL data from the transmitting UE, the receiving UE decodes the same, transmits HARQ ACK for a successfully received PSSCH, and transmits HARQ NACK for a PSSCH having an error. In this case, the transmitting UE may determine the number of repeated transmissions for second SL data based on the number of received HARQ ACKs and/or the number of received HARQ NACKs.

When the number of repeated transmissions is changed, the transmitting UE transmits second sidelink control information (SCI) including dynamic configuration information reflecting this to the receiving UE (S1360), configures repetition of a second PSSCH based on the dynamic configuration information and repeatedly transmits the same to the receiving UE (S1370).

Figure 14:
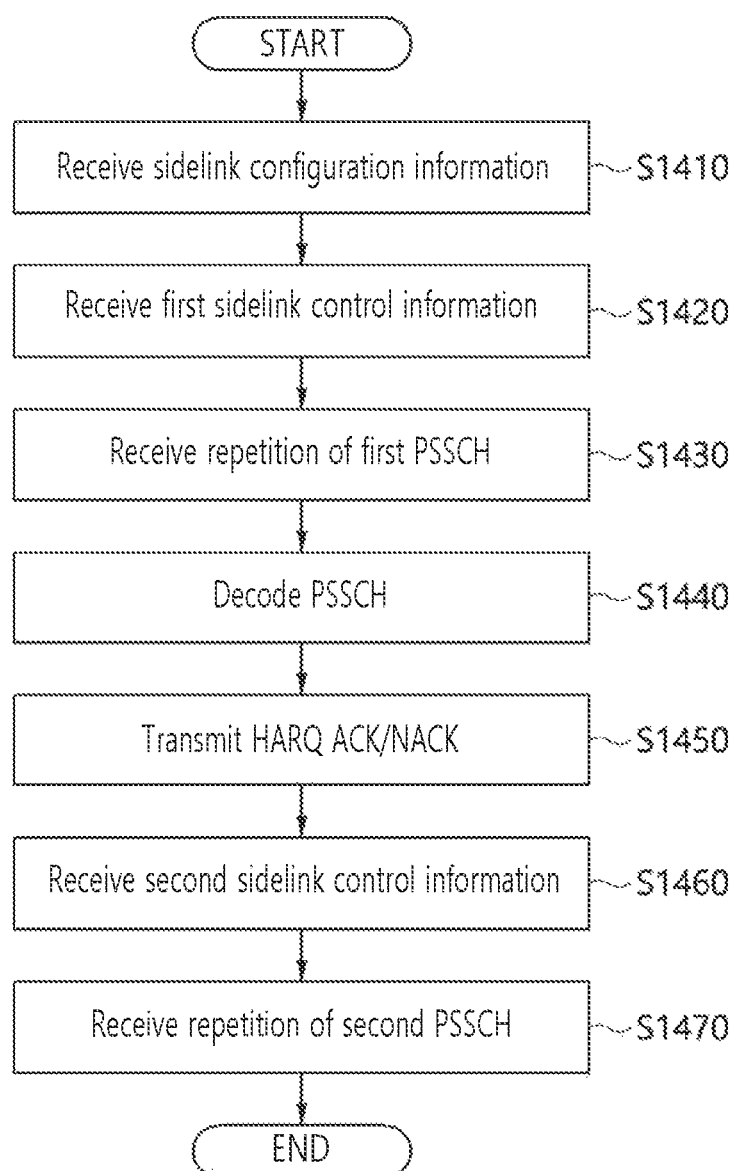
FIG. 14 shows an operation sequence of a receiving UE in the sidelink data transmission method according to the embodiment FIG. 10.

FIG. 14 shows an operation sequence of a receiving UE in the sidelink data transmission method according to the embodiment of FIG. 10.

Referring to FIG. 14, the receiving UE receives sidelink configuration information from a base station through RRC signaling (S1410). In this case, the sidelink configuration information received through RRC signaling may be static and/or semi-static configuration information. Here, the sidelink configuration information may include system information and RRC configuration information regarding repeated transmissions of SL data, and may include a default or maximum number of repeated transmissions for SL data, time/frequency resource information used for transmission of the SL data, SL BWP configuration information, mini-slot length information, and the like.

The receiving UE receives first sidelink control information (SCI) from a transmitting UE (S1420).

In this case, the first sidelink control information may be information on dynamic configuration. Here, the first sidelink control information may include resource allocation information used for actual repeated transmission, information on the number of repetitions, whether frequency hopping (FH) is applied during repeated transmission, and the like. To this end, a new field may be added to SCI.

In the present embodiment, the base station may inform the transmitting UE and the receiving UE of the default or maximum number of repeated transmissions through RRC, and the transmitting UE may inform the receiving UE of the actual number of repeated transmissions through SCI when it is necessary to change the number of repeated transmissions. Alternatively, the transmitting UE may inform the receiving UE of information on a difference between the default or maximum number of repeated transmissions and the actual number of repeated transmissions through SCI.

The receiving UE receives repetition of a first PSSCH from the transmitting UE (S1430). Here, the PSSCH transmitted from the transmitting UE is a PSSCH obtained when the transmitting UE determines the number of repeated transmissions and transmission resources for the same SL data based on the sidelink configuration information received from the base station and generates a PSSCH based thereon.

For example, when it is determined that beamforming will be used for repeated transmission of the first PSSCH, the transmitting UE may configure SCI based on beamforming related information included in an RRC message received from the base station, transmit the same to the receiving UE, and form multiple beams to repeatedly transmit SL data. In this case, SL unicast or SL groupcast may be performed depending on the number of receiving UEs.

As another example, when it is determined that frequency hopping (FH) will be used for repeated transmission of the first PSSCH, the transmitting UE may configure SCI based on FH related information included in the RRC message received from the base station, transmit the same to the receiving UE, and perform FH in the frequency domain at the time of transmitting SL data. The method of applying FH during SL data transmission may be the same as that of the embodiment of FIG. 9 or FIG. 10.

Upon reception of repetition of the first PSSCH for the same SL data from the transmitting UE, the receiving UE decodes the same (S1440) and transmits HARQ ACK/NACK for repetition of the first PSSCH to the transmitting UE based on the decoding result (S1450).

For example, when the receiving UE receives repetition of the first PSSCH for first SL data from the transmitting UE, the receiving UE may decodes the same, transmit HARQ ACK for a successfully received PSSCH, and transmit HARQ NACK for a PSSCH having an error. In this case, the transmitting UE may determine the number of repeated transmission of second SL data based on the number of received HARQ ACKs and/or the number of received HARQ NACKs. In step S1450, the receiving UE may directly transmit HARQ ACK/NACK for repetition of the first PSSCH to the base station instead of the transmitting UE.

When the number of repeated transmissions is changed according to HARQ ACK/NACK transmitted to the transmitting UE, the receiving UE receives second sidelink control information (SCI) including dynamic configuration information reflecting this from the transmitting UE (S1460) and receive repeated transmission of a second PSSCH generated based on the dynamic configuration information from the transmitting UE (S1470).

Figure 15:
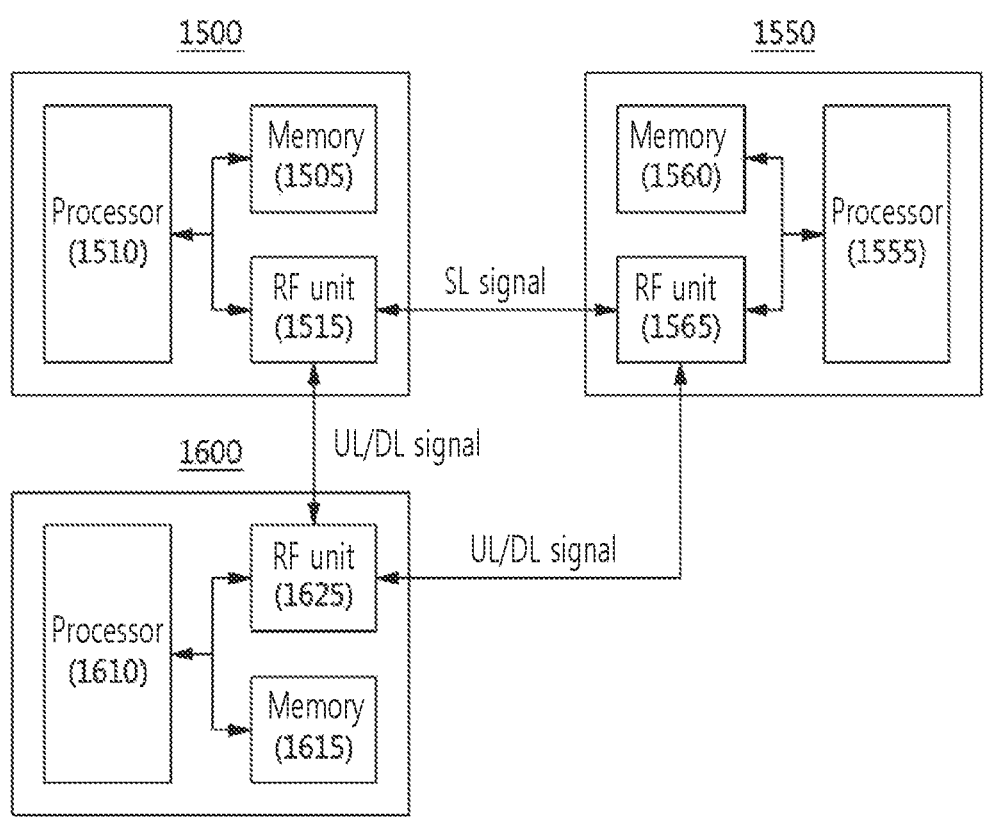
FIG. 15 is a block diagram illustrating a wireless communication system in which an embodiment of the present disclosure is implemented.

FIG. 15 is a block diagram illustrating a wireless communication system in which an embodiment of the present disclosure implemented.

Referring to FIG. 15, UEs 1500 and 1550 include memories 1505 and 1560, processors 1510 and 1555, and radio frequency (RF) units 1515 and 1565. The memories 1505 and 1560 are connected to the processors 1510 and 1555 and store various types of information for driving the processors 1510 and 1555. The RF units 1515 and 1565 are connected to the processors 1510 and 1555 to transmit and/or receive radio signals. For example, the RF units 1515 and 1565 may receive a downlink signal, such as an RRC message and a configuration and/or control information such as DCI described in the present disclosure from a base station 1600. In addition, the RF units 1515 and 15165 may transmit an uplink signal such as HARQ ACK/NACK described in the present disclosure to the base station 1600 or transmit and/or receive sidelink signals such as a PSSCH and SCI to other UEs 1500 and 1550.

The processors 1510 and 1555 implement the functions, processes and/or methods of a UE proposed in the present disclosure. Specifically, the processors 1510 and 1555 perform the operation of the UE according to FIGS. 9 and/or 10. For example, the processors 1510 and 1555 may configure a plurality of PSSCHs and control repeated transmission thereof according to an embodiment of the present disclosure. In all embodiments of the present disclosure, the operations of the UEs 1500 and 1550 may be implemented by the processors 1510 and 1565.

The memories 1505 and 1560 may store control information and configuration information according to the present disclosure and may provide the control information and configuration information to the processors 1510 and 1555 according to a request of the processors 1510 and 1555.

The base station 1600 includes a processor 1610, a memory 1615, and an RF unit 1625. The memory 1615 is connected to the processor 1610 and stores various types of information for driving the processor 1610. The RF unit 1625 is connected to the processor 1610 to transmit and/or receive a radio signal. The processor 1610 implements the functions, processes and/or methods of the base station proposed in the present disclosure. In the above-described embodiments, the operation of the base station may be implemented by the processor 1610. The processor 1210 may generate an RRC message, downlink control information, and the like described in the present disclosure or determine the number of repeated transmissions of SL data, resources used therefor, and the like.

The processor may include an application-specific integrated circuit (ASIC), other chipsets, a logic circuit, and/or a data processing device. The memory may include a read-only memory (ROM), a random access memory (RAM), a flash memory, a memory card, storage media, and/or other storage devices. The RF unit may include a baseband circuit for processing a radio signal. When an embodiment of the present disclosure is implemented as software, the above-described methods may be implemented as modules (processes, functions, etc.) that perform the above-described functions. The modules may be stored in the memory and executed by the processor. The memory may be provided inside or outside the processor and may be connected to the processor by various well-known means.

In the exemplary system described above, methods are described on the basis of a flowchart as a series of steps or blocks, but the present disclosure is not limited to the order of steps, and some steps may occur in a different order or concurrently with other steps as described above. In addition, those skilled in the art will understand that the steps shown in the flowchart are not exclusive and that other steps may be included or that one or more steps in the flowchart may be deleted without affecting the scope of the present disclosure.

What is claimed is:

1. A method for transmitting and receiving data by a first user equipment (UE) in a communication system, the method comprising:
   receiving sidelink repetitive transmission information from a base station;
   performing physical sidelink shared channel (PSSCH) repetitive transmissions including sidelink data for a second UE based on the sidelink repetitive transmission information, the sidelink repetitive transmission information including at least one of a first number of repetitive transmissions for the PSSCH, and time/frequency resource information used for repetitive transmissions of the PSSCH; and
   determining a second number of repetitive transmissions for the PSSCH based on response information received by the first UE from the second UE in response to the PSSCH repetitive transmissions,
   wherein the second number of repetitive transmissions is equal to, greater than, or less than the first number of repetitive transmissions.

2. The method of claim 1, wherein the response information is Hybrid Automatic Repeat Request Acknowledgment/Negative-Acknowledgement (HARQ ACK/NACK).

3. The method of claim 2, wherein the first UE determines the second number of repetitive transmissions based on a number of HARQ ACK/NACK, and performs the PSSCH repetitive transmissions based on the second number of repetitive transmissions.

4. The method of claim 1, wherein the second number of repetitive transmissions is changed within a change range, and the change range is configured on the first UE based on system information or radio resource control (RRC) signaling.

5. The method of claim 1, wherein the PSSCH repetitive transmissions are performed based on frequency hopping.

6. The method of claim 5, wherein the frequency hopping is performed using a bandwidth part (BWP) that is active for the first UE.

7. The method of claim 1, wherein the sidelink repetitive transmission information is transmitted through system information or RRC signaling.

8. The method of claim 1, wherein the sidelink repetitive transmission information is configured as static or semi-persistent.

9. A first user equipment (UE) for transmitting and receiving data in a communication system, the first UE comprising
   a transceiver configured to receive sidelink repetitive transmission information from a base station;
   a processor configured to:
   perform physical sidelink shared channel (PSSCH) repetitive transmissions including sidelink data for a second UE based on the sidelink repetitive transmission information, the sidelink repetitive transmission information including at least one of a first number of repetitive transmissions for the PSSCH, and time/frequency resource information used for repetitive transmissions of the PSSCH; and
   determine a second number of repetitive transmissions for the PSSCH based on response information received by the first UE from the second UE in response to the PSSCH repetitive transmissions,
   wherein the second number of repetitive transmissions is equal to, greater than, or less than the first number of repetitive transmissions.

10. The first UE of claim 9, wherein the response information is Hybrid Automatic Repeat Request Acknowledgment/Negative-Acknowledgement (HARQ ACK/NACK).

11. The first UE of claim 10, wherein the first UE determines the second number of repetitive transmissions based on a number of HARQ ACK/NACK, and performs the PSSCH repetitive transmissions based on the second number of repetitive transmissions.

12. The first UE of claim 9, wherein the second number of repetitive transmissions is changed within a change range, and the change range is configured on the first UE based on system information or radio resource control (RRC) signaling.

13. The first UE of claim 9, wherein the PSSCH repetitive transmissions are performed based on frequency hopping.

14. The first UE of claim 13, wherein the frequency hopping is performed using a bandwidth part (BWP) that is active for the first UE.

15. The first UE of claim 9, wherein the sidelink repetitive transmission information is transmitted through system information or RRC signaling.

16. The first UE of claim 9, wherein the sidelink repetitive transmission information is configured as static or semi-persistent.

* * * * *